(12) United States Patent
Uehara et al.

(10) Patent No.: US 6,338,053 B2
(45) Date of Patent: *Jan. 8, 2002

(54) INVENTORY MANAGING METHOD FOR AUTOMATIC INVENTORY RETRIEVAL AND APPARATUS THEREOF

(75) Inventors: Tadahiro Uehara; Hiroyuki Yoshida; Rieko Yamamoto; Hiroshi Sakurai, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,517

(22) Filed: Jul. 14, 1998

(30) Foreign Application Priority Data

Jan. 8, 1998 (JP) ............................................. 10-002589

(51) Int. Cl.⁷ ........................... G06F 17/30; G06F 17/60
(52) U.S. Cl. .............................. 707/1; 705/22; 705/28; 705/29
(58) Field of Search .............................. 705/28, 22, 29; 707/1

(56) References Cited

U.S. PATENT DOCUMENTS

| | | | |
|---|---|---|---|
| 5,228,116 A | * 7/1993 | Harris et al. .................... 706/50 |
| 5,261,088 A | * 11/1993 | Baird et al. .................... 707/206 |
| 5,333,317 A | * 7/1994 | Dann ............................ 395/600 |
| 5,379,422 A | * 1/1995 | Antoshenkov ................... 707/1 |
| 5,418,947 A | * 5/1995 | Hsu et al. ....................... 707/1 |
| 5,434,775 A | * 7/1995 | Sims et al. ................... 364/403 |
| 5,566,333 A | * 10/1996 | Olson et al. ................. 395/600 |
| 5,806,065 A | * 9/1998 | Lomet ............................ 707/8 |
| 5,857,169 A | * 1/1999 | Seide .......................... 704/256 |
| 6,029,170 A | * 2/2000 | Grager et al. ................ 707/100 |

OTHER PUBLICATIONS

Gudes, Ehud, "A Uniform Indexing Scheme for Object–Oriented Databases," IEEE, pp. 238–246, Feb. 26, 1996.*

Chen, Lin and Schott, Rene', "Optimal Operations on Red–Black Trees," IEEE, pp. 529–533, May 27, 1993.*

Golfarelli, Matteo, Maio, Dario, and Rizzi, Stefano, "Conceptual Design of Data Warehouses from E/R Schemes," IEEE, pp. 334–342, Feb. 26, 1996.*

Castro, Luis, Jay Hanson, and Tom Rettig. Advanced Programmer's Guide. Ashton–Tate: Culver City, 1985 (pp. 77–102).*

* cited by examiner

Primary Examiner—Jack Choules
Assistant Examiner—Ella Colbert
(74) Attorney, Agent, or Firm—Staas & Halsey, LLP

(57) ABSTRACT

Individual attributes are designated to individual hierarchical levels of an inventory information tree stored in an inventory information tree structure storing unit. Each node that structures the inventory information tree defines at least the type of an attribute of a commodity, the value thereof, the inventory quantity of the commodity that satisfies a classification condition corresponding to the position on the tree, and the relation with another node. While an inventory retrieving unit is searching each node on the inventory information tree corresponding to a retrieving condition designated with a combination of the attribute of the commodity and the value thereof, the unit executes an inventory retrieving process for updating the inventory quantity of each node. The unit searches nodes with priority corresponding to their positions in hierarchical levels with attributes that are not included in a retrieving condition.

17 Claims, 27 Drawing Sheets

| ID | ATTRIBUTE | VALUE | INVENTORY QUANTITY | PARENT ID |
|---|---|---|---|---|
| 1 | COMMODITY | COMMODITY A | 800 | 0 |
| 2 | COMMODITY | COMMODITY B | 1200 | 0 |
| 3 | COLOR | RED | 600 | 1 |
| 4 | COLOR | BLUE | 200 | 1 |
| 5 | SIZE | M | 300 | 3 |
| 6 | SIZE | L | 200 | 3 |
| 7 | SIZE | S | 100 | 3 |
| 8 | SIZE | L | 100 | 4 |
| 9 | SIZE | M | 50 | 4 |
| 10 | SIZE | S | 50 | 4 |
| 11 | SIZE | M | 1000 | 2 |
| 12 | SIZE | S | 200 | 2 |
| 13 | SIZE | L | 200 | 2 |
| 14 | COLOR | RED | 400 | 11 |
| 15 | COLOR | BLUE | 400 | 11 |
| 16 | COLOR | YELLOW | 200 | 11 |

FIG. 2

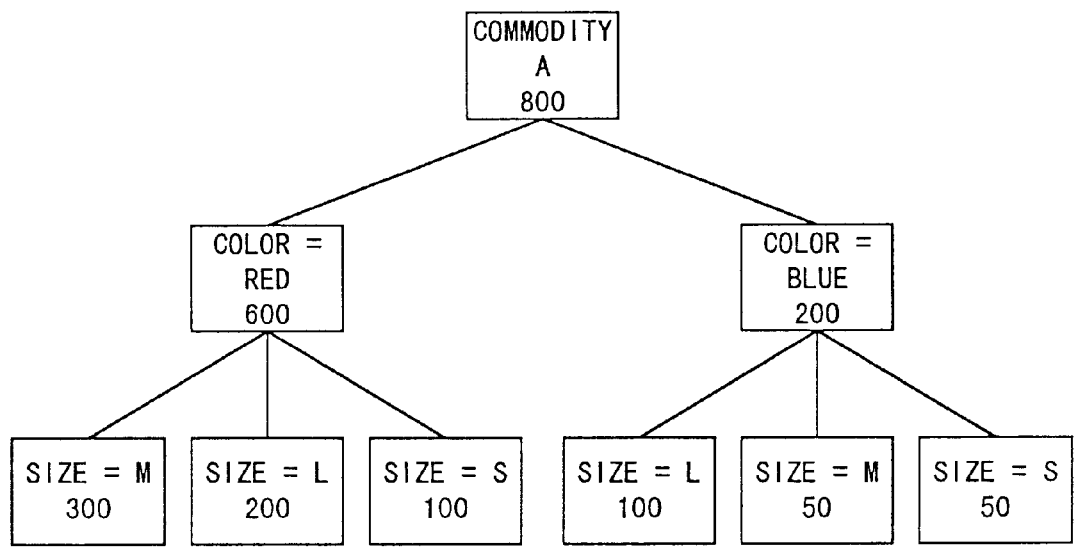
(A)
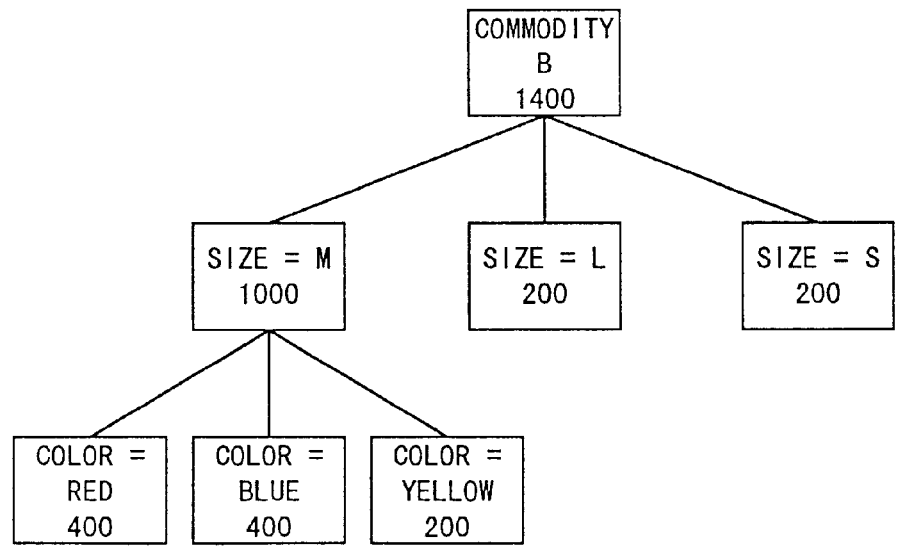
(B)
FIG. 3

| NODE ID | POINTER TO NODE |
|---------|-----------------|
| NODE ID | POINTER TO NODE |

FIG. 5

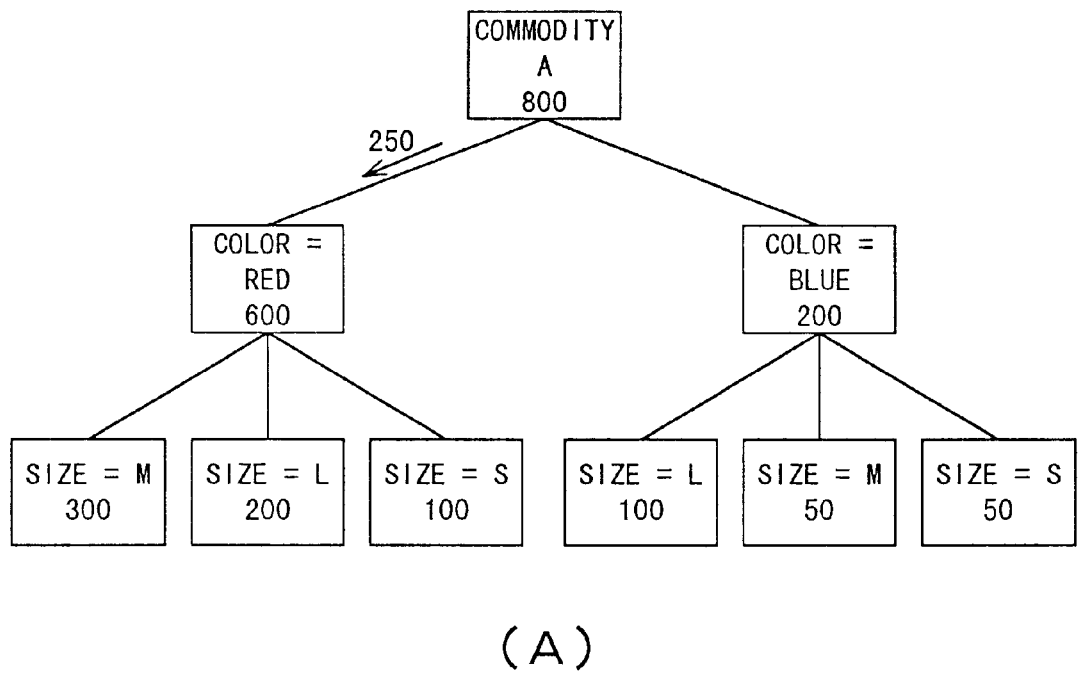
(A)
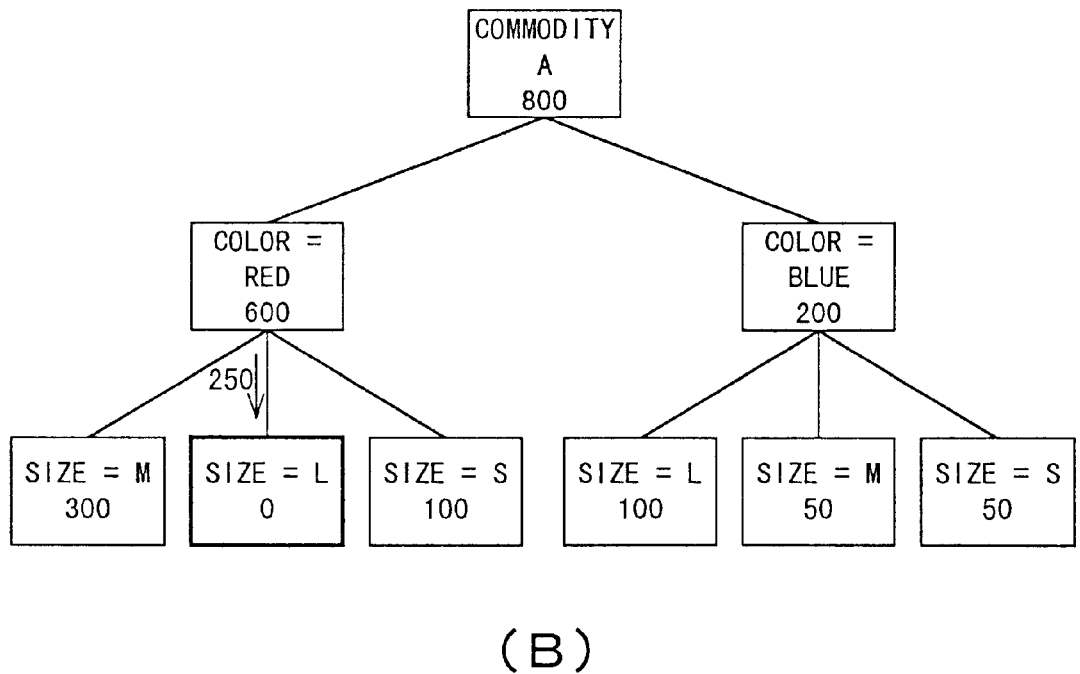
(B)
FIG. 6

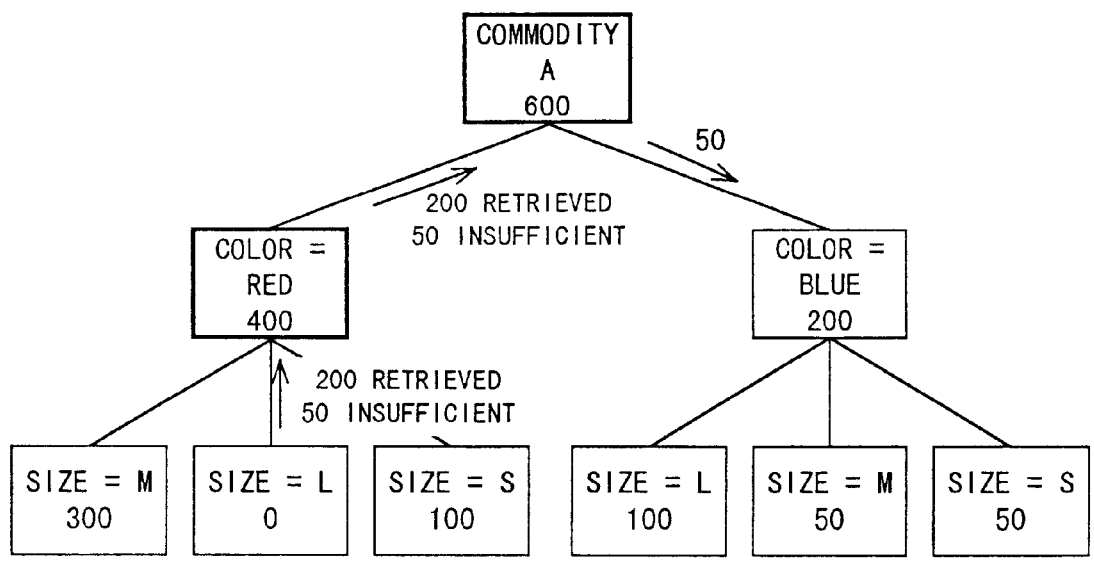
(C)
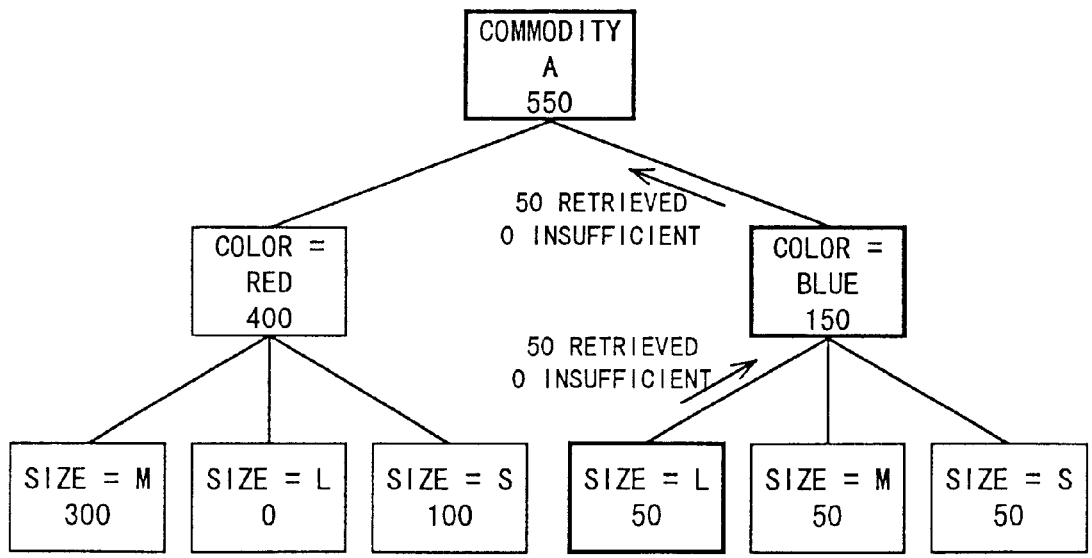
(D)
FIG. 7

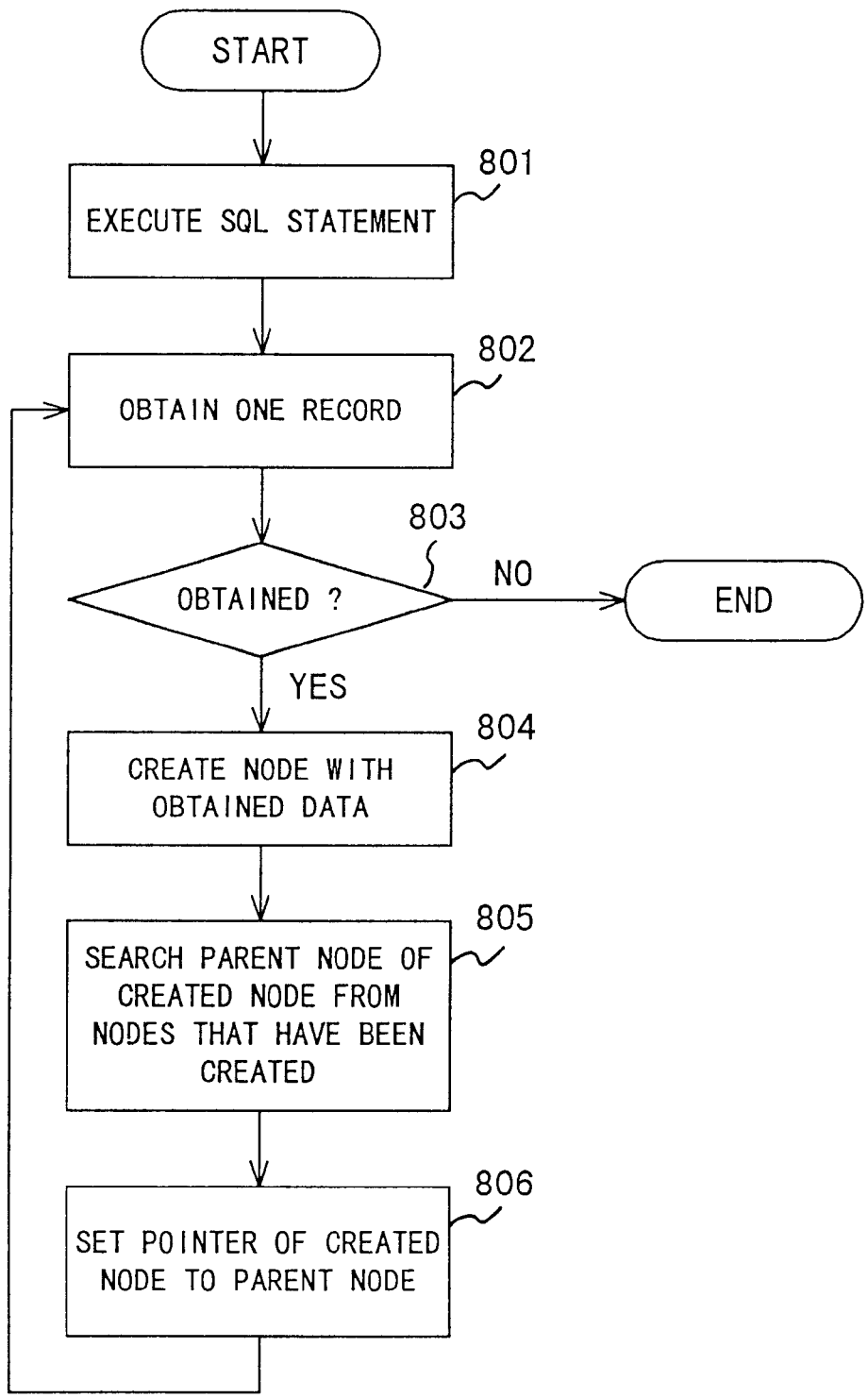
F I G. 8

| ID | ATTRIBUTE | VALUE | INVENTORY QUANTITY | PARENT ID | COMMODITY CODE |
|---|---|---|---|---|---|
| 1 | COMMODITY | COMMODITY A | 800 | 0 | COMMODITY A |
| 2 | COMMODITY | COMMODITY B | 1200 | 0 | COMMODITY B |
| 3 | COLOR | RED | 600 | 1 | COMMODITY A |
| 4 | COLOR | BLUE | 200 | 1 | COMMODITY A |
| 5 | SIZE | M | 300 | 3 | COMMODITY A |
| 6 | SIZE | L | 200 | 3 | COMMODITY A |
| 7 | SIZE | S | 100 | 3 | COMMODITY A |
| 8 | SIZE | L | 100 | 4 | COMMODITY A |
| 9 | SIZE | M | 50 | 4 | COMMODITY A |
| 10 | SIZE | S | 50 | 4 | COMMODITY A |
| 11 | SIZE | M | 1000 | 2 | COMMODITY B |
| 12 | SIZE | S | 200 | 2 | COMMODITY B |
| 13 | SIZE | L | 200 | 2 | COMMODITY B |
| 14 | COLOR | RED | 400 | 11 | COMMODITY B |
| 15 | COLOR | BLUE | 400 | 11 | COMMODITY B |
| 16 | COLOR | YELLOW | 200 | 11 | COMMODITY B |

FIG. 9

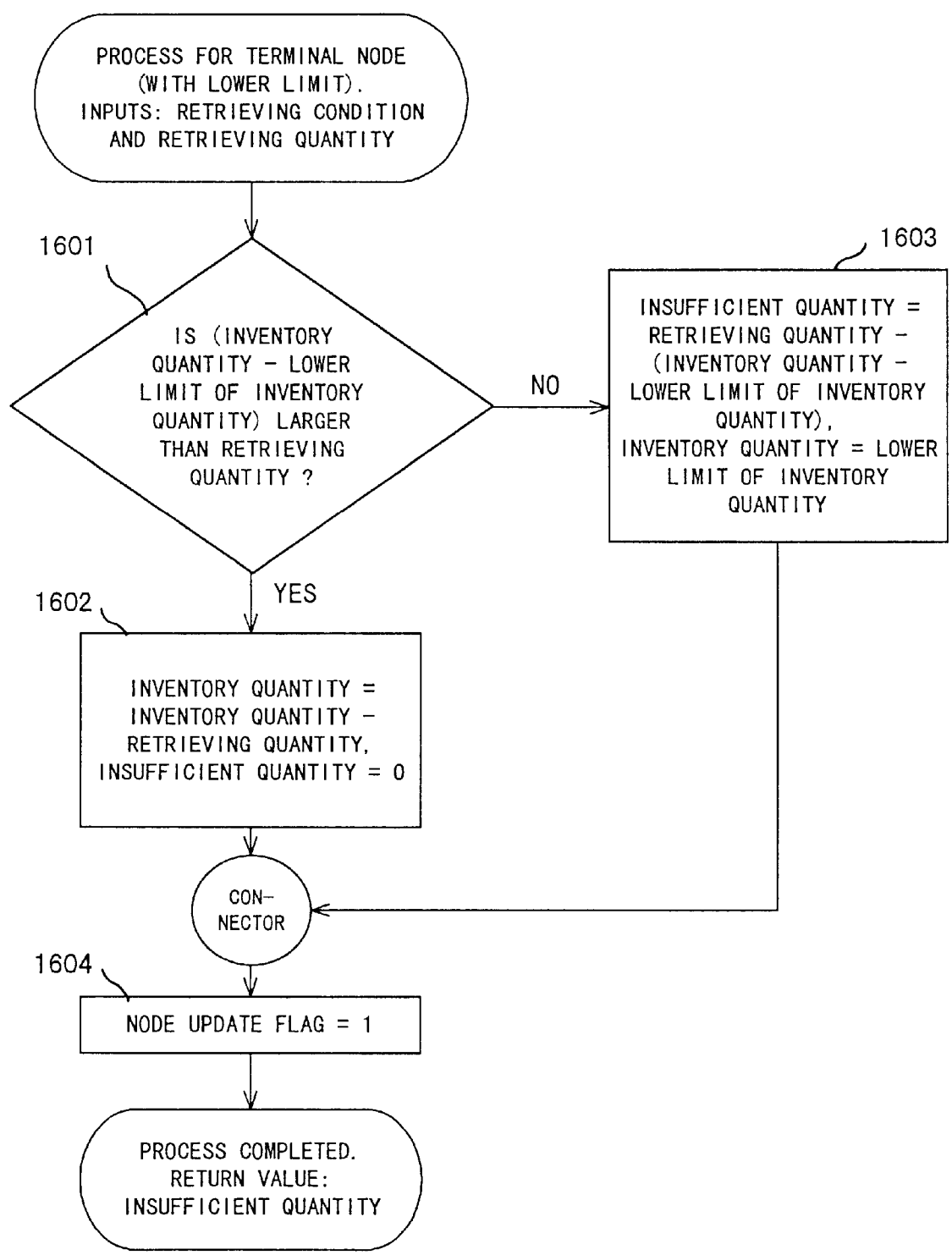
F I G. 16

| ID | ATTRIBUTE | VALUE | INVENTORY QUANTITY | PARENT ID | PRECEDING NODE ID | COMMODITY CODE |
|---|---|---|---|---|---|---|
| 1 | COMMODITY | COMMODITY A | 800 | 0 | | COMMODITY A |
| 2 | COMMODITY | COMMODITY B | 1200 | 0 | | COMMODITY B |
| 3 | COLOR | RED | 600 | 1 | | COMMODITY A |
| 4 | COLOR | BLUE | 200 | | 3 | COMMODITY A |
| 5 | SIZE | M | 300 | 3 | | COMMODITY A |
| 6 | SIZE | L | 200 | | 5 | COMMODITY A |
| 7 | SIZE | S | 100 | | 6 | COMMODITY A |
| 8 | SIZE | L | 100 | 4 | | COMMODITY A |
| 9 | SIZE | M | 50 | | 8 | COMMODITY A |
| 10 | SIZE | S | 50 | | 9 | COMMODITY A |
| 11 | SIZE | M | 1000 | 2 | | COMMODITY B |
| 12 | SIZE | S | 200 | | 11 | COMMODITY B |
| 13 | SIZE | L | 200 | | 12 | COMMODITY B |
| 14 | COLOR | RED | 400 | 11 | | COMMODITY B |
| 15 | COLOR | BLUE | 400 | | 14 | COMMODITY B |
| 16 | COLOR | YELLOW | 200 | | 15 | COMMODITY B |

(A)

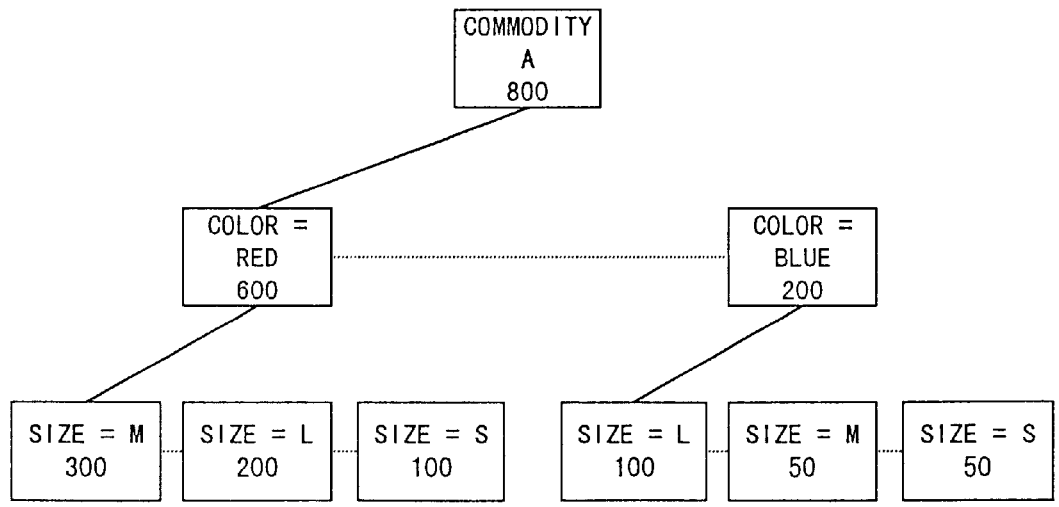

| ID | ATTRIBUTE | VALUE | INVENTORY QUANTITY | PARENT ID | PRECEDING ID | COMMODITY CODE |
|---|---|---|---|---|---|---|
| 1 | COMMODITY | COMMODITY A | 900 | 0 | | COMMODITY A |
| 2 | COMMODITY | COMMODITY B | 1200 | 0 | | COMMODITY B |
| 3 | COLOR | RED | 600 | 1 | | COMMODITY A |
| 4 | COLOR | BLUE | 200 | | 17 | COMMODITY A |
| 5 | SIZE | M | 300 | 3 | | COMMODITY A |
| | | OMITTED | | | | |
| 15 | COLOR | BLUE | 400 | | 14 | COMMODITY B |
| 16 | COLOR | YELLOW | 200 | | 15 | COMMODITY B |
| *17* | *COLOR* | *WHITE* | *100* | | *3* | *COMMODITY A* |

※ ITALIC DATA REPRESENTS CHANGED/ADDED DATA.

F I G. 2 6

INVENTORY MANAGING METHOD FOR AUTOMATIC INVENTORY RETRIEVAL AND APPARATUS THEREOF

BACKGROUND OF THE INVENTION

1. Field of the Invention

The present invention relates to an inventory retrieving process in a sales circulation business.

2. Description of the Related Art

An inventory managing technology using a database system is becoming common in sales circulation businesses.

In a table of an inventory management database, each commodity item is registered as one record entry. Each record is composed of a plurality of fields of attributes such as color and size.

When an inventory retrieving process is performed for extracting a desired commodity item that satisfies a particular condition from the database table, inquiry conditions are designated for individual attributes (fields) of the table.

In such a conventional inventory retrieving process, designated attributes affect the result of the inventory retrieving process. In other words, attributes that have not been designated do not affect the result.

Thus, all conditions for an inventory retrieving process should be defined as conditions of particular attributes. Consequently, some experience is required to designate such conditions. In other words, the inventory retrieving process cannot be always flexibly performed.

In reality, to perform an inventory retrieving process in such a manner that commodity items of M size are retrieved with higher priority than commodity items of L size, a condition "M size" is designated to a "size" attribute. Thereafter, a condition "L size" is designated to the "size" attribute. In this case, two steps of the inventory retrieving process are required. Thus, conventionally, it is difficult to designate to the database an automatic inventory retrieving rule such as "unless a size is designated, commodity items of M size are allocated with higher priority than commodity items of L size".

SUMMARY OF THE INVENTION

The present invention is made from the above described point of view. An object of the present invention is to accomplish an automatic inventory retrieving process corresponding to a predetermined rule even if a designated condition of the inventory retrieving process is not part of the query.

The present invention is based on an inventory managing apparatus for performing an inventory management for a management object.

The inventory managing apparatus has a database table (inventory information tree DB) composed of records to which nodes that form a binary tree are assigned, each of the nodes being defined with at least the type of an attribute of the management object, the value thereof, an inventory quantity of the management object that satisfies a classification condition represented by the position of the node on the binary tree data, and the relation of a link to another node.

In addition, the inventory managing apparatus has an inventory retrieving unit (104) for searching each node on the binary tree data through the database table corresponding to a retrieving condition defined with a combination of the attribute and value of the management object, executing an inventory retrieving process for updating the inventory quantity of each node, and searching each node with a priority corresponding to the horizontal position of each node in hierarchical levels with attributes that are not included in the retrieving condition (the query).

In the structure of the present invention, even if a condition of the inventory retrieving process is not part of the query, the inventory retrieving process can be automatically performed corresponding to an inventory retrieving rule based on the searching priority in a binary tree data structure.

The apparatus may have an inventory stocking unit (105) for executing an inventory stocking process for updating the inventory quantity of each node while searching each node on the binary tree data through the data base corresponding to a stocking condition defined with a combination of the attribute and value of the management object.

The apparatus may have a binary tree data structure creating unit for developing the binary tree data from the database table to a memory unit, wherein the inventory retrieving unit or the inventory stocking unit executes the inventory retrieving process or the inventory stocking process for the binary tree data developed in the memory unit.

Due to the configuration of the present invention, the desired binary tree data can be located quickly.

Each record may have an identification information field for storing identification information having a value corresponding to the position of the node on the binary tree data. The binary tree data structure creating unit develops the binary tree data from the database table to the memory unit corresponding to the content of the identification information field.

In an embodiment of the present invention, with a simple query to a database table, binary tree data can be developed from the database table to the memory unit.

Each record may have a management object type field for storing the type of the management object. The binary tree data structure creating unit develops the binary tree data for each management object type from the database table to the memory unit corresponding to the content of the management object type field.

In the structure of the present invention, with a simple query to the database table, binary tree data can be developed from the database table to the memory unit.

Each node that forms the binary tree data stored in the memory unit may have node update information that represents whether or not the inventory quantity corresponding to each node has been updated by the inventory retrieving unit or the inventory stocking unit. The apparatus may have a database updating unit for affecting the update state of the binary tree data developed in the memory unit to the database table corresponding to the node update information.

In an embodiment of the present invention, binary tree data in the memory unit can be effectively matched with the database table.

In addition, the present invention can be effectuated by a storage medium from which a computer reads a program that causes the computer to perform the function accomplished by the structure of the first aspect of the present invention.

BRIEF DESCRIPTION OF DRAWINGS

The above and other objects, features and advantages of the present invention will become more apparent in light of the following detailed description of a best mode embodiment thereof, as illustrated in the accompanying drawings, wherein

FIG. 2 is a table showing an example of the data structure of an inventory information tree database (DB) (No. 1);

FIGS. 3(A) and 3(B) are examples of inventory information trees;

FIG. 5 is a schematic diagram showing the data structure of the inventory information tree (No. 2);

FIGS. 6(A) and 6(B) are schematic diagrams showing examples of the inventory retrieving process (No. 1);

FIGS. 7(C) and 7(D) are schematic diagrams showing examples of the inventory retrieving process (No. 2);

FIG. 8 is a flowchart showing a process of inventory information tree structure creating unit;

FIG. 9 is a table showing an example of the data structure of the inventory information tree DB (No. 2);

FIG. 16 is a flowchart showing a process for a terminal node with a lower limit of an inventory quantity in the inventory retrieving process;

FIGS. 25(A) and 25(B) are respectively a table and a schematic diagram showing an example of the structure of an inventory information tree DB according to a second embodiment of the present invention;

FIG. 26 is a table for explaining the structure of the inventory information tree DB according to the second embodiment of the present invention.

DESCRIPTION OF PREFERRED EMBODIMENTS

Next, with reference to the accompanying drawings, preferred embodiments of the present invention will be described.

Figure 1:
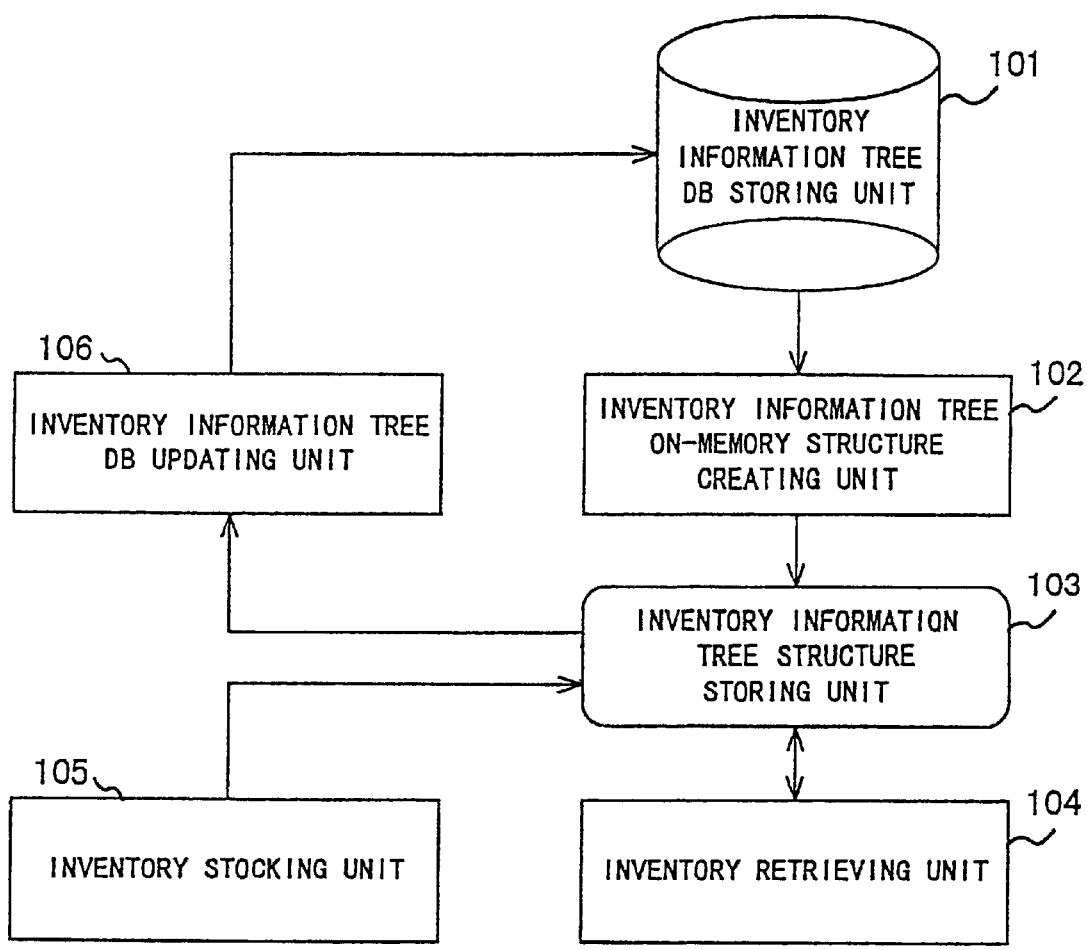
FIG. 1 is a block diagram showing the configuration of a system according to an embodiment of the present invention.

FIG. 1 is a block diagram showing the structure of a system according to an embodiment of the present invention.

In an embodiment of the present invention, inventory information is managed with a database having a tree (binary tree) structure. The tree structure of all inventory information is stored in an inventory information tree database (inventory information tree DB) storing unit 101 shown in FIG. 1. The storing unit 101 is an auxiliary storing unit such as a hard disk.

In this example, one hierarchical level of the inventory information tree is designated to one attribute of a commodity item. Nodes corresponding to individual values of the attribute are located in that particular hierarchical level.

As shown in FIG. 2, on the inventory information tree DB table stored in the inventory information tree DB storing unit 101, one node structures one record. Each record has a node ID field, an attribute type (color, size, etc.) field, an attribute value (red, blue, M size, L size, etc.) field, an inventory quantity field, a parent ID field, and so forth. The parent ID field represents the node ID of the parent node linked to the current node.

With the inventory information tree DB having the data structure shown in FIG. 2, inventory information tree structures shown in FIGS. 3(A) and 3(B) can be created for individual commodity items. In FIGS. 3(A) and 3(B), each box corresponds to a node. Straight lines drawn between boxes denote links between nodes represented with information stored in the parent ID field of the inventory information tree DB. In addition, "commodity", "color", "size", and so forth correspond to information stored in the attribute field of the inventory information tree DB. "commodity A", "commodity B", "red", "blue", "yellow", "M", "L", "S", and so forth correspond to information stored in the value field of the inventory information tree DB. "800", "600", and so forth correspond to information stored in the inventory quantity field.

In the embodiment of the present invention, to allow the inventory information tree for each commodity item to be accessed at high speed, an inventory information tree structure creating unit 102 develops the structure of the inventory information tree for each commodity item shown in FIGS. 3(A) and 3(B) from the inventory information tree DB storing unit 101, which is an auxiliary storing unit, to an inventory information tree structure storing unit 103 that is a semiconductor storing unit.

Figure 4:
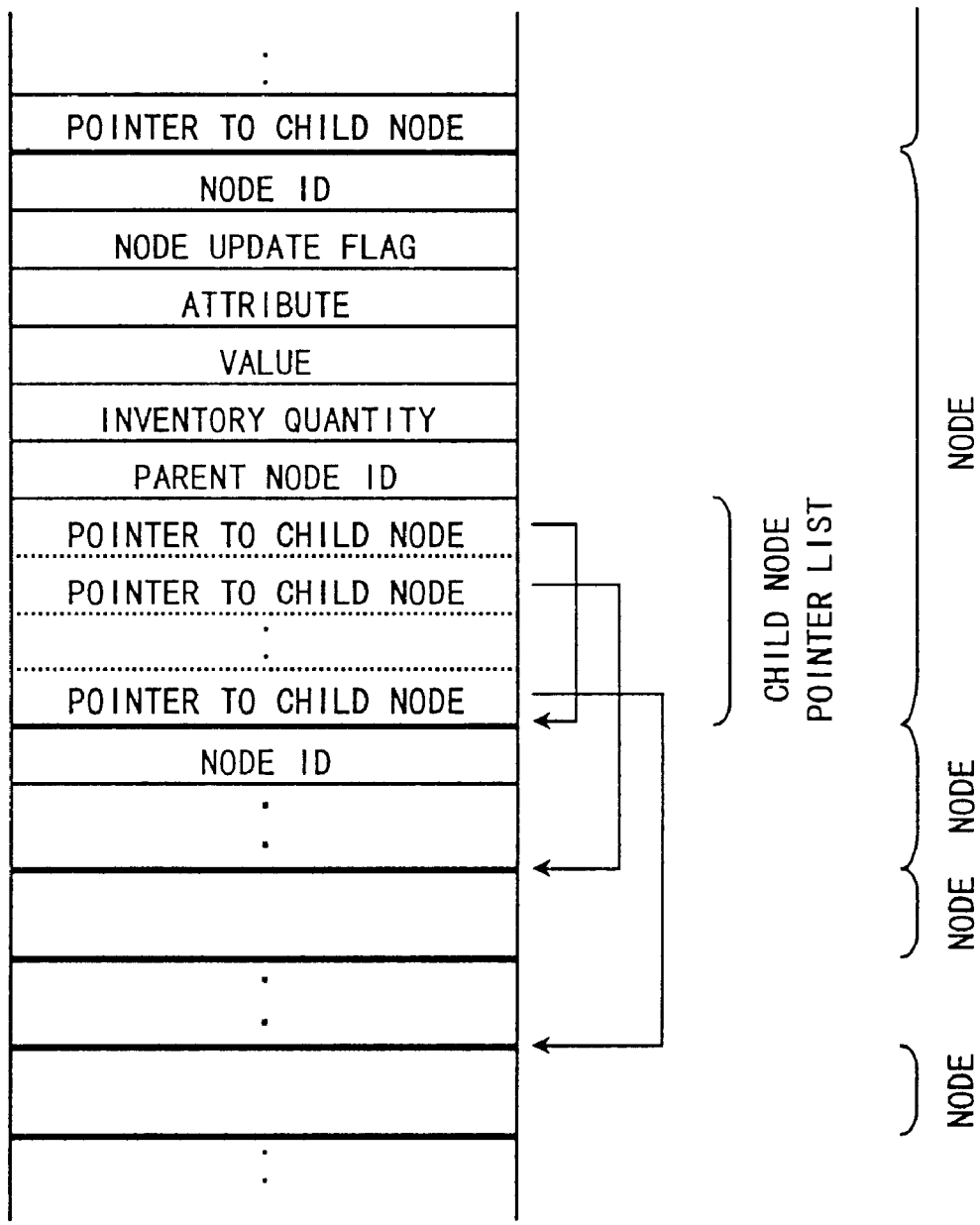
FIG. 4 is a schematic diagram showing the data structure of an inventory information tree (No. 1)
Figure 5:
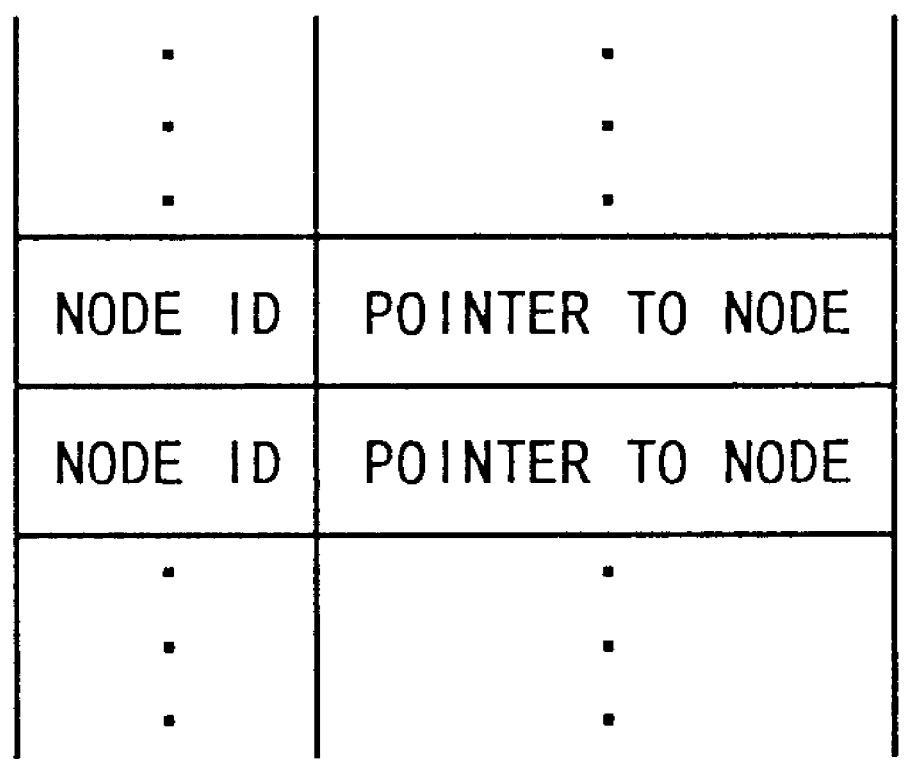

FIGS. 4 and 5 are schematic diagrams showing the data structure of the inventory information tree structure developed to the inventory information tree structuring storing unit 103.

As shown in FIG. 4, the inventory information tree structure has a data structure (or object instance) composed of a node ID, a node update flag, an attribute, a value, an inventory quantity, a parent note ID, and a child node pointer list for each node.

Moreover, as shown in FIG. 5, the inventory information tree structure has a map table that stores pointers to addresses of data structures for individual node IDs.

In the data structure for each node shown in FIG. 4, the node ID, the attribute, the value, the inventory quantity, and the parent node ID correspond to the ID field, the attribute field, the value field, the inventory quantity field, and the parent ID field of the inventory information tree DB shown in FIG. 2, respectively.

When the inventory quantity of the current node is updated by an inventory retrieving unit 104 and an inventory stocking unit 105, a node update flag is set to "1". Only for a node whose node update flag has been set to "1" in the inventory information tree structure, an inventory information tree DB updating unit 106 shown in FIG. 1 updates the inventory quantity field of the record corresponding to the current node on the inventory information tree DB stored in the inventory information tree DB storing unit 101. Thus, the inventory information tree DB and the inventory information tree structure can be effectively matched.

The child node pointer list is a list of pointers to addresses of data structures of nodes. In this case, the node that has the list is a parent node of these nodes. The child node pointer list is data that allows the inventory retrieving unit 104 to effectively navigate from a node in higher hierarchical level to a node in a lower hierarchical level in the inventory information tree structure.

On the other hand, the map table shown in FIG. 5 is created and used by the inventory information tree structure creating unit 102 (that will be described later).

The inventory retrieving unit 104 shown in FIG. 1 performs an automatic inventory retrieving process for the inventory information tree structure having the data structure (shown in FIG. 4) stored in the inventory information tree structure storing unit 103 corresponding to an inventory retrieving rule expressed by the inventory information tree as shown in FIGS. 6 and 7.

Now, assume that a retrieving condition "retrieve 250 commodities A of size L" is designated the inventory retrieving unit 104.

In this case, the inventory information tree structure shown in FIG. 6(A) is accessed in the inventory information tree structure storing unit 103.

First, the inventory retrieving unit 104 executes a navigation from a node in the highest hierarchical level to terminal nodes in the lowest hierarchical level in the inventory information tree structure corresponding to the following navigation algorithm.

(1) When lower hierarchical layers corresponding to an attribute designated with a retrieving condition are navigated, nodes with the same attribute designated with the retrieving condition are navigated.

(2) When lower hierarchical layers corresponding to an attribute that is not designated with the retrieving condition are navigated, nodes are recursively navigated from the left end to the right end of the tree until the retrieving condition is satisfied.

When the retrieving condition "retrieve 250 commodities A of size L" is input, in the example shown in FIG. 6(A), since a "color" attribute has not been designated in the retrieving condition, an intermediate node with a "color=red" attribute is searched from the left end of the just lower hierarchical level.

Next, terminal nodes with a "size" attribute are searched from the left end of the lowest hierarchical level. Thus, the commodities A with the inventory quantity "200" are retrieved from the terminal node with a "size=L" attribute. Thus, as shown in FIG. 6(B), the inventory quantity of the node becomes "0".

Since the retrieving condition is "250", as shown in FIG. 7(C), an insufficient quantity "50" is returned to an intermediate node with the "color=red" attribute in the just higher hierarchical level. Thus, in the intermediate node, the retrieving condition is changed to "supply 50 commodities A of size L".

Since the child nodes of the intermediate node do not have terminal nodes that have not been navigated and that satisfy the new retrieving condition, the insufficient quantity "50" is returned to the node with the "commodity A" attribute in the highest hierarchical level.

As a result, since the retrieving condition does not have a "color" attribute, as shown in FIG. 7(C), an intermediate node with a "color=blue" attribute is searched in the just lower hierarchical level.

Next, terminal nodes with a "size" attribute are successively searched from the left end of the next lowest hierarchical level. Thus, the commodities A with the inventory quantity "100" are retrieved from a terminal node with a "size=L" attribute. Consequently, as shown in FIG. 7(D), the inventory quantity of the terminal node becomes "50".

As shown in FIG. 7(C), the insufficient quantity "0" is returned from the terminal node to the intermediate node with the "color=blue" attribute in the just higher hierarchical level. In addition, the insufficient quantity "0" is returned from the intermediate node to the node with the "commodity A" attribute in the highest hierarchical level.

Since the insufficient quantity "0" is determined with the node in the highest hierarchical level, the inventory retrieving process is completed.

The inventory retrieving process may be directly performed for the inventory information tree DB in the inventory information tree DB storing unit 101 rather than the inventory information tree structure in the inventory information tree structure storing unit 103. However, when the inventory retrieving process can be more quickly performed with the inventory information tree structure than the inventory information tree DB.

Since the navigation of the inventory retrieving process is executed for the inventory information tree corresponding to the above-described navigation algorithm, even if a condition of the inventory retrieving process is not present in the query, the inventory retrieving process can be automatically performed corresponding to an inventory retrieving rule based on the searching priority of a tree structure.

FIG. 8 is a flowchart showing the process of the inventory information tree structure creating unit 102. A description of the tree structure creating unit follows.

To create an inventory information tree structure corresponding to a particular value of the "commodity" attribute (for example, commodity A), an SQL (Structured Query Language) statement is executed for extracting a record group corresponding to the particular commodity value from the table of the inventory information tree DB stored in the inventory information tree DB storing unit 101 (at step 801 shown in FIG. 8).

In this embodiment, the inventory information tree DB is provided as an SQL database.

In this embodiment, in addition to the structure shown in FIG. 2 as shown in FIG. 9, a "commodity code" field is added to the table structure of the inventory information tree DB so that a record group corresponding to a particular commodity value can be extracted with one SQL statement.

In this embodiment, a smaller value of node ID is set to an ID field of a record corresponding to a node included in a higher hierarchical level of the inventory tree. In addition, a smaller value of node ID is set to an ID field of a record corresponding to a node at a leftmost portion in the same hierarchical level. Thus, a node with a small value of node ID has higher priority of the navigation on the inventory information tree in the inventory retrieving process.

Moreover, by setting values in the ID field with non-continuous skipped numbers, nodes can be easily added.

An SQL statement executed at step 801 shown in FIG. 8 has the. following format.

Select from TABLE NAME where COMMODITY CODE=COMMODITY A order by ID

Figure 10:
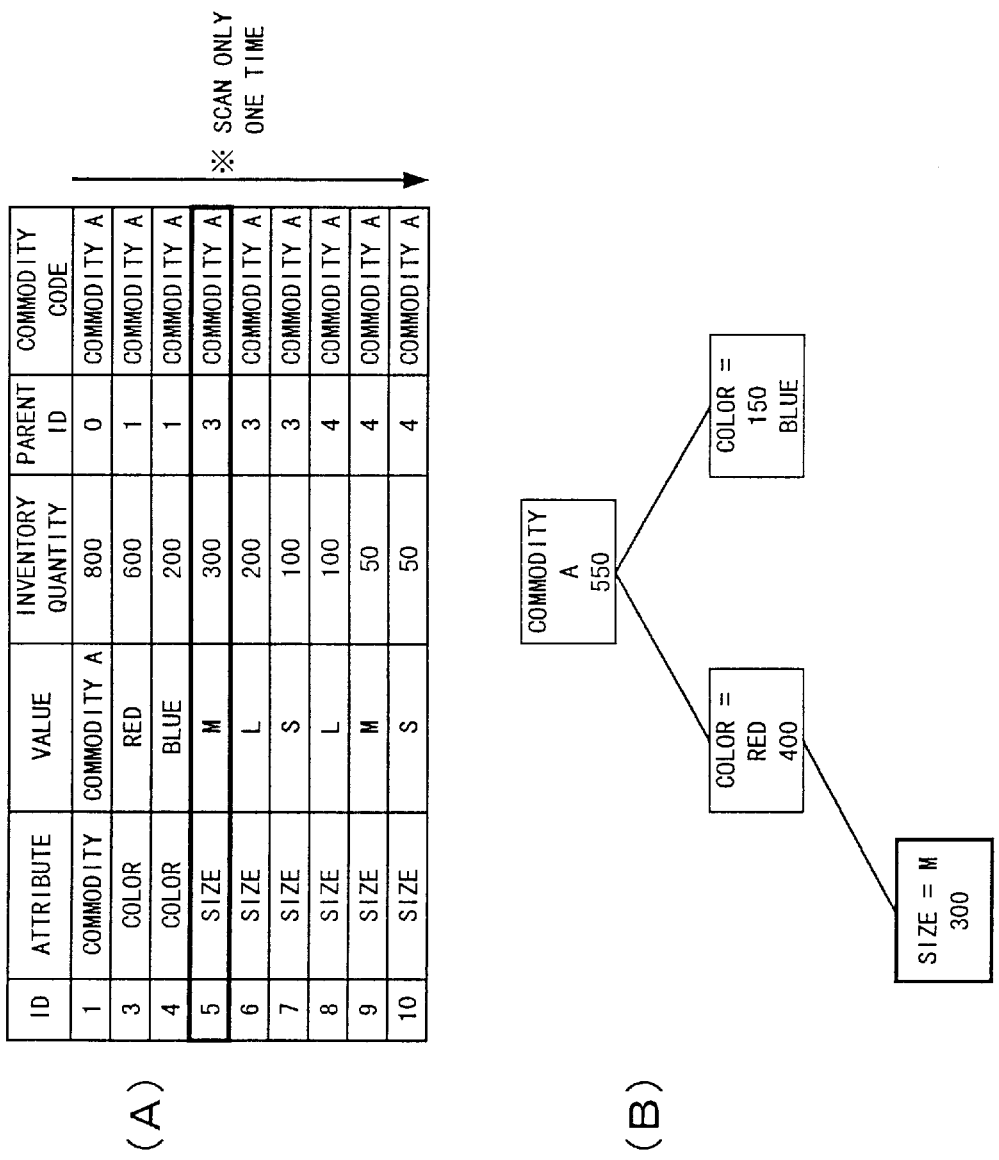
FIGS. 10(A) and 10(B) are respectively a table and a schematic diagram for explaining an inventory information tree structure creating process.

In the record group that has been extracted, nodes are arranged in the order of node IDs having smaller values corresponding to the inventory information tree structure. The nodes of the record group are scanned from the top as shown in FIG. 10(A) by a loop of steps 802 to 806 shown in FIG. 8. Thus, the inventory information tree structure can be created from the highest hierarchical level to the lower hierarchical level of the inventory information tree as shown in FIG. 10(B).

First, one record is obtained from the extracted record group (at step 802).

Next, it is determined whether or not a record has been obtained (at step 803).

When the determined result at step 803 is Yes, a node is created with the data of the obtained record (at step 804).

In reality, a data structure (or object instance) of one node with the data structure shown in FIG. 4 is allocated in the inventory information tree structure storing unit 103. Various values stored in the ID field, the attribute field, the value field, the inventory quantity field, and the parent ID field of the record obtained from the inventory information tree DB table are copied to the variable members of the node ID, the attribute, the value, the inventory quantity, and the parent node ID of the data structure. In addition, the node update flag of the data structure is set to "0".

In addition, at step 804, the node ID of the created node and the pointer to the data structure of the node are registered to the map table shown in FIG. 5.

Next, the data structure of a node corresponding to the parent node ID designated to the data structure of the node created at step 804 is searched from the map table shown in FIG. 5 (at step 805).

The pointer of the data structure of the node created at step 804 is registered to the child node pointer list of the data structure searched at step 805 (at step 806). Actually, the list is allocated in a record area that is different from the data structure. In the data structure, a pointer to the record area is stored.

Thereafter, the flow returns to step 802. At step 802, the next record is obtained from the record group obtained at step 801. Next, steps 802 to 806 are executed.

When a record is not obtained (namely, the determined result at step 803 is No), the process for creating the inventory information table structure corresponding to one commodity (for example, commodity A) is completed.

Detailed Description of Process of Inventory Retrieving unit 104

Figure 11:
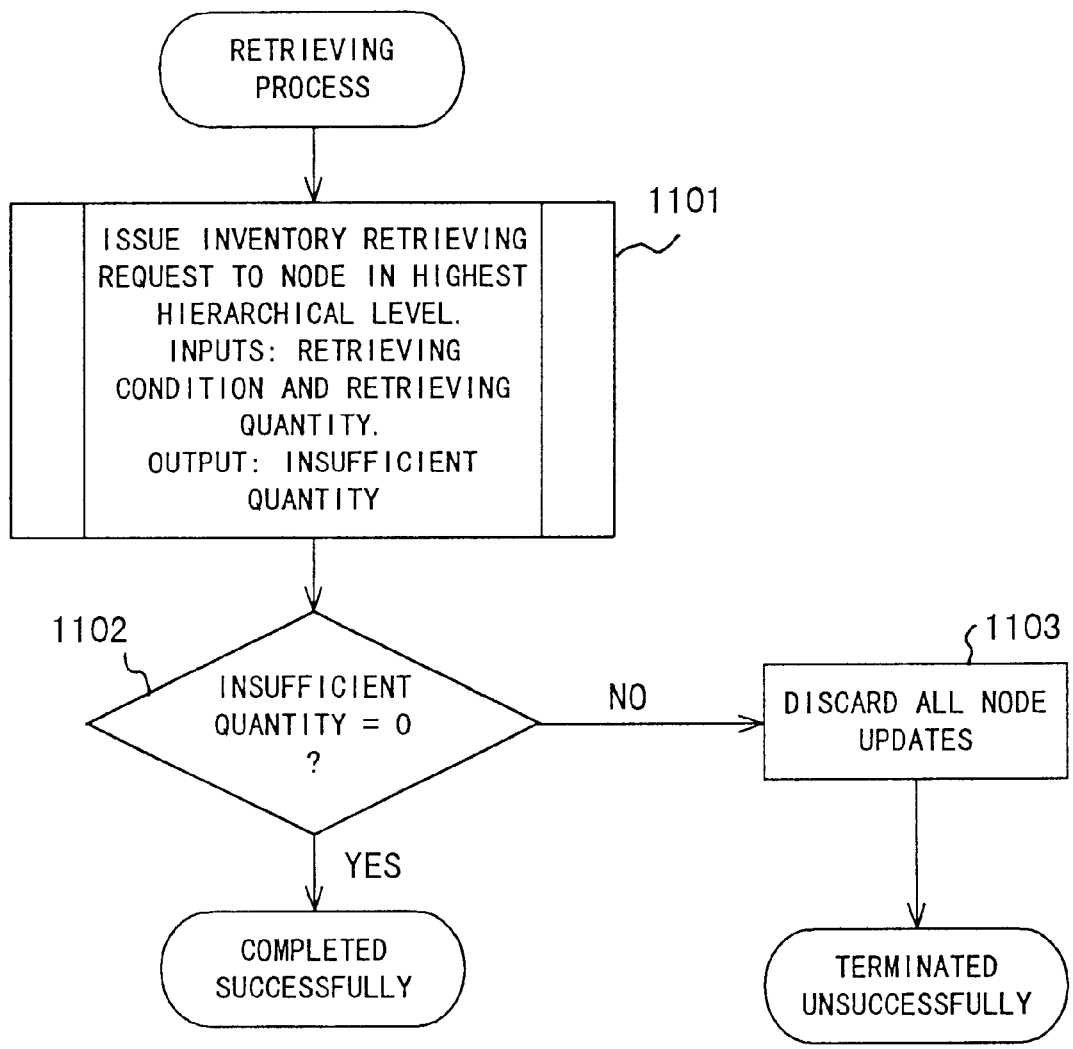
FIG. 11 is a flowchart showing a main flow of an inventory retrieving process.

FIGS. 11 to 14 are flowcharts showing the process of the inventory retrieving unit 104. FIG. 11 is a flowchart showing a main flow of the process.

First, an inventory retrieving request is issued to a node in the highest hierarchical level (at step 1101 shown in FIG. 11). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Figure 12:
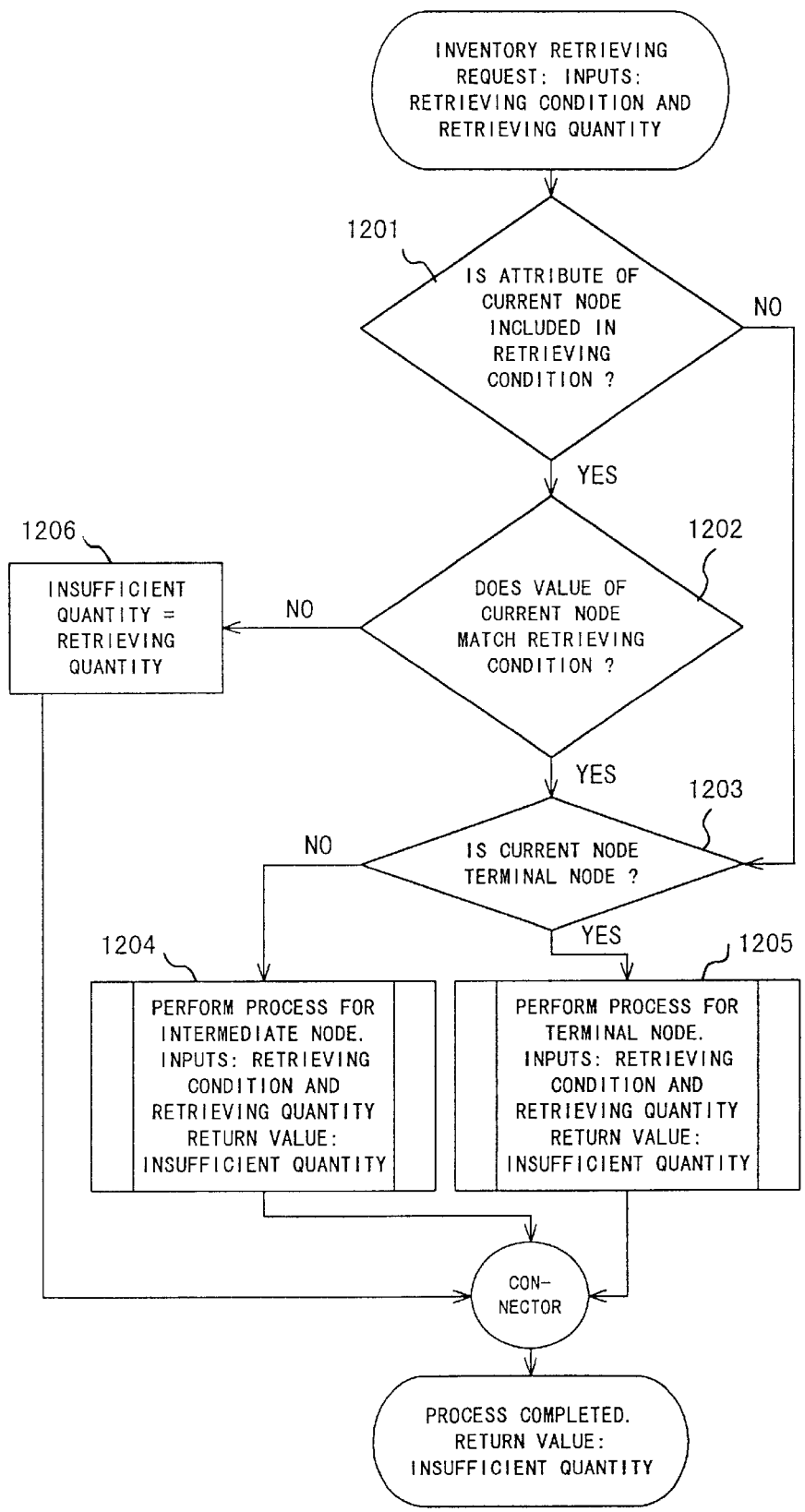
FIG. 12 is a flowchart showing an inventory retrieving request process.

FIG. 12 is a flowchart showing an inventory retrieving request process called at step 1101 shown in FIG. 11.

First, it is determined whether or not the attribute of the data structure of the current node (see FIG. 4) is included in the retrieving condition (at step 1201 shown in FIG. 12). In the example shown in FIG. 6(A), the "commodity" attribute of the data structure of the node in the highest hierarchical level is included in the above-described retrieving condition, the determined result at step 1201 is Yes.

When the determined result at step 1201 is Yes, it is determined whether or not the value of the data structure of the current node matches the retrieving condition (at step 1201 shown in FIG. 12). In the example shown in FIG. 6(A), since the "commodity A" value of the data structure of the node in the highest hierarchical level matches the retrieving condition, the determined result at step 1202 is Yes.

When the determined result at step 1202 is Yes, it is determined whether or not the current node is a terminal node (at step 1203). In the example shown in FIG. 6(A), since the node in the highest hierarchical level is not a terminal node, the determined result at step 1203 is No.

When the determined result at step 1203 is No, a process for an intermediate node is executed (at step 1204 shown in FIG. 12). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Figure 13:
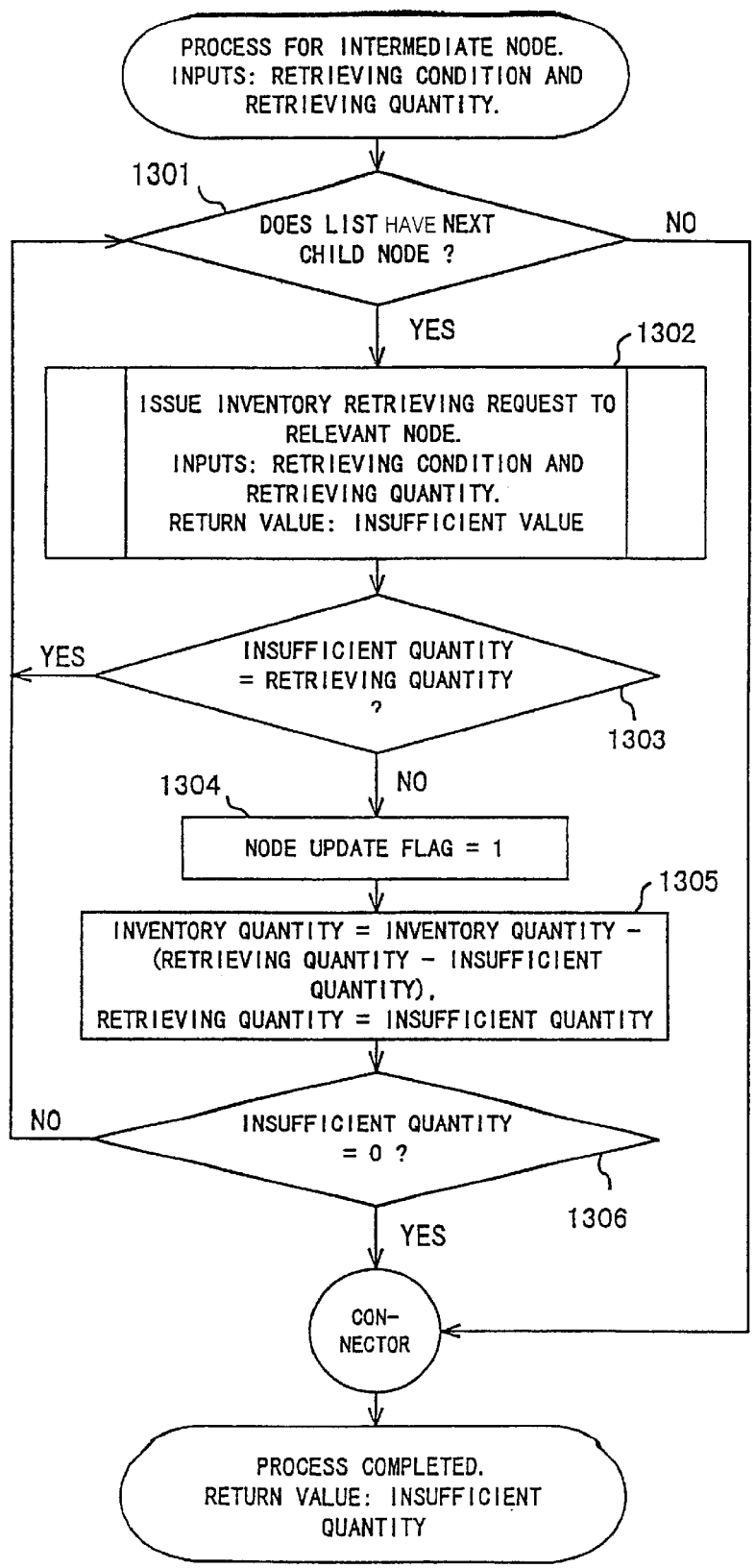
FIG. 13 is a flowchart showing a process for an intermediate node in the inventory retrieving process.

FIG. 13 is a flowchart showing a process for an intermediate node called at step 1204 shown in FIG. 12.

First, a child node is searched (at step 1301 shown in FIG. 13). In the example shown in FIG. 6(A), since the child pointer list of the data structure of the node in the highest hierarchical level stores at the top a pointer to a node with a "color=red" attribute value, the determined result at step 1301 is Yes.

When the determined result at step 1301 is Yes, an inventory retrieving request is issued to a relevant node (at step 1302 shown in FIG. 12). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

The inventory retrieving request process called at step 1302 shown in FIG. 13 is executed corresponding to the flowchart. shown in FIG. 12.

First, it is determined whether or not the attribute of the data structure of the current node is included in the retrieving condition (at step 1201 shown in FIG. 12). In the example shown in FIG. 6(A), since the "color=red" attribute of the data structure of the node is not included in the retrieving condition, the determined result at step 1201 is No.

When the determined result at step 1201 is No, it is determined whether or not the current node is a terminal node (at step 1203). In the example shown in FIG. 6(A), since the current node with the "color=red" attribute value is not a terminal node, the determined result at step 1203 is No.

When the determined result at step 1203 is No, a process for an intermediate node is executed (at step 1204 shown in FIG. 12). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Thus, the process for the intermediate node corresponding to the flowchart shown in FIG. 13 is called again at step 1204 shown in FIG. 12.

First, a child node is searched (at step 1301 shown in FIG. 13). In the example shown in FIG. 6(A), since the child node pointer list of the data structure of the node with the "color=red" attribute stores at the top a pointer to a node with a "size=M" attribute, the determined result at step 1301 is Yes.

When the determined result at step 1301 is Yes, as described above, an inventory retrieving request is issued to a relevant child node (at step 1302 shown in FIG. 13). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Thus, the inventory retrieving request process corresponding to the flowchart shown in FIG. 12 is called at step 1302 shown in FIG. 13.

It is determined whether or not the attribute of the data structure of the current node is included in the retrieving condition (at step 1201 shown in FIG. 12). In the example shown in FIG. 6(A), since a "size" attribute of the data structure of a node with a "size=M" attribute value in a lower hierarchical level of a node with the "color=red" attribute is included in the retrieving condition, the determined result at step 1201 is Yes.

When the determined result at step 1201 is Yes, it is determined whether or not the value of the data structure of the current node matches the retrieving condition (at step 1202 shown in FIG. 12). In the example shown in FIG. 6(A), since the "size=M" attribute value does not match the retrieving condition, the determined result at step 1202 is No.

When the determined result at step 1202 is No, the retrieving quantity is set to the insufficient quantity (at step 1206). Thus, the inventory retrieving request process at step 1302 shown in FIG. 13 is completed. In the example shown in FIG. 6(A), the insufficient quantity is "250".

In FIG. 13, at step 1303, it is determined whether or not the insufficient quantity matches the retrieving quantity. In the example shown in FIG. 6(A), when the flow is returned from the inventory retrieving request process for the child node with the "size=M" attribute value in a lower hierarchical level of the node with the "color=red" attribute, since the insufficient quantity (=250) matches the retrieving quantity (=250), the determined result at step 1303 is Yes.

When the determined result at step 1303 is Yes, the next child node is searched (at step 1301 shown in FIG. 13). In the example shown in FIG. 6(A), since the child pointer list of the data structure of the node with the "color=red" attribute stores at the second position a pointer to a node with a "size=L" attribute, the determined result at step 1301 is Yes.

When the determined result at step 1301 is Yes, the inventory retrieving request is issued to the relevant child node (at step 1302 shown in FIG. 13). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Thus, the inventory retrieving request process corresponding to the flowchart shown in FIG. 12 is called again at step 1302 shown in FIG. 13.

First, it is determined whether or not the attribute of the data structure of the current node is included in the retrieving condition (at step 1201 shown in FIG. 12). In the example shown in FIG. 6(A), since the "size" attribute of the data structure of the node with the "size=L" attribute value in a lower hierarchical level of the node with the "color=red" attribute value is included in the attributing condition, the determined result at step 1201 is Yes.

When the determined result at step 1201 is Yes, it is determined whether or not the value of the data structure of the current node matches the retrieving condition (at step 1202 shown in FIG. 12). In the example shown in FIG. 6(A), since the "size=L" attribute matches the retrieving condition, the determined result at step 1203 is Yes.

When the determined result at step 1202 is Yes, it is determined whether or not the current node is a terminal node (at step 1203). In the example shown in FIG. 6(A), since the node with the "size=L" attribute value in a lower hierarchical level of the node with the "color=red" attribute value is a terminal node, the determined result at step 1203 is No.

When the determined result at step 1203 is Yes, a process for a terminal node is executed (at step 1205 shown in FIG. 12). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"

Retrieving quantity: "250"

Figure 14:
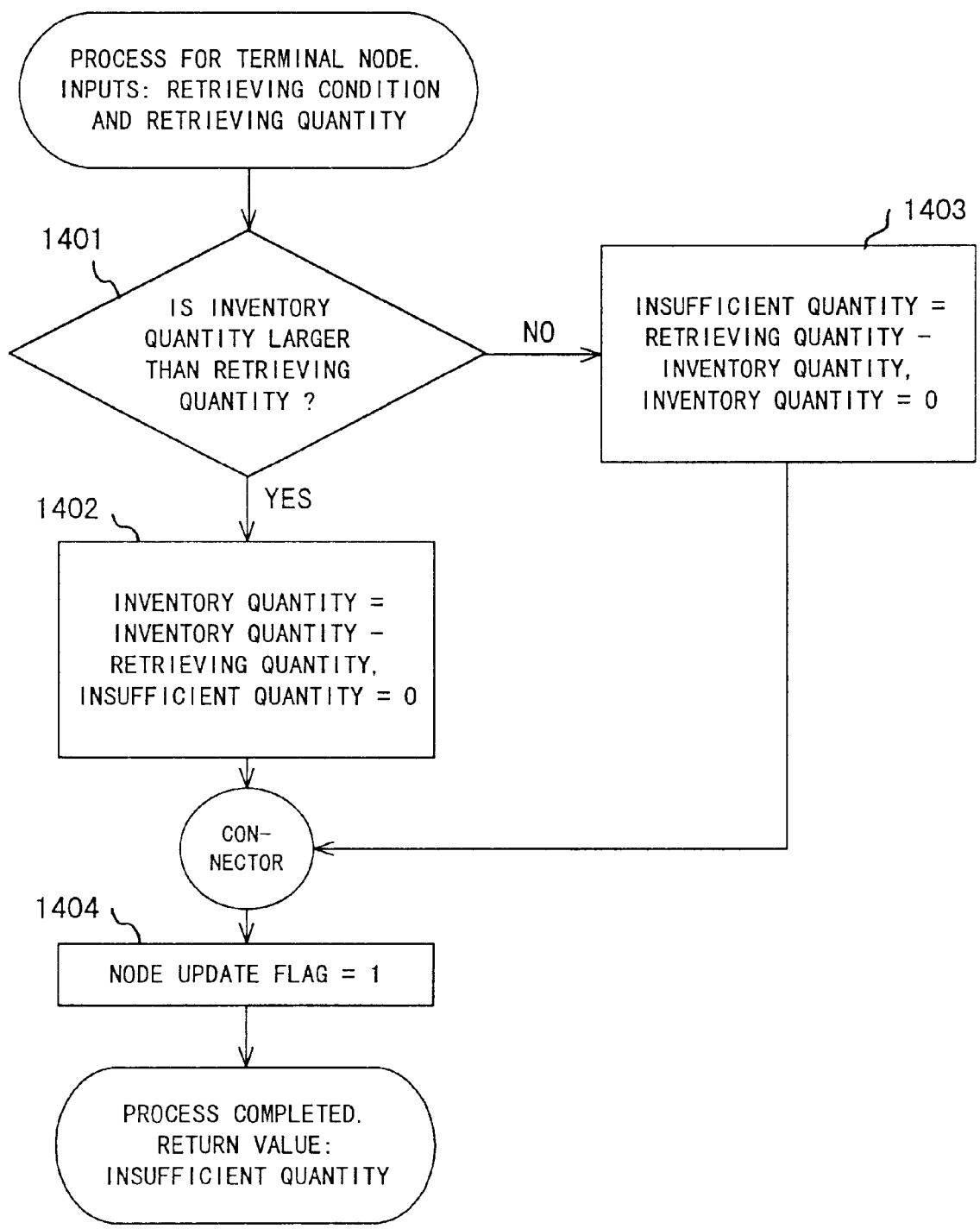
FIG. 14 is a flowchart showing a process for a terminal node in the inventory retrieving process.

FIG. 14 is a flowchart showing the process for the terminal node called at step 1205 shown in FIG. 12.

First, it is determined whether or not the inventory quantity of the data structure of the terminal node is larger than the retrieving quantity (at step 1401 shown in FIG. 14). In the example shown in FIG. 6(A), since the inventory quantity (=200) of the data structure of the terminal node with the "size =L" attribute value in a lower hierarchical level of the node with the "color=red" attribute value is smaller than the retrieving quantity (=250), the determined result at step 1401 is No.

When the determined result at step 1401 is No, the value of the current inventory quantity is subtracted from the retrieving quantity and is set to be the insufficient quantity. The new inventory quantity is set to "0" (at step 1403 shown in FIG. 14). In the example shown in FIG. 6(A)→FIG. 6(B)→FIG. 7(C), in the process for the terminal node with the "size =L" attribute value in a lower hierarchical level of the node with the "color=red" attribute value, the insufficient quantity is given as follows.

Insufficient quantity=retrieving quantity−inventory quantity=250−200=50

A new inventory quantity (=50) is set to the data structure as follows.

Inventory quantity=0

Thereafter, the node update flag of the data structure of the terminal node is set to "1" (at step 1404 shown in FIG. 14). The process for the terminal node at step 1205 shown in FIG. 12 is completed. In addition, the inventory retrieving request process at step 1302 shown in FIG. 13 is completed.

In FIG. 13, at step 1303, it is determined whether or not the insufficient quantity matches the retrieving quantity. In the example shown in FIG. 6(A), when the flow is returned from the inventory retrieving request process for the child node with the "size=L" attribute value in a lower hierarchical level of the node with the "color=red" attribute value, as described above, the insufficient quantity (=50) does not match the retrieving quantity (=25). Thus, the determined result at step 1303 is No.

When the determined result at step 1303 is No, the node update flag of the data structure of the current intermediate node is set to "1" (at step 1304 shown in FIG. 13). In other words, the inventory quantity of the relevant node is updated. In addition, the inventory quantity of the parent node is updated as follows. Thus, the node update flag is set. In the example shown in FIG. 7(C), the node update flag of the data structure of the node with the "color=red" attribute value is set to "1".

Next, the the insufficient quantity value is subtracted from the retrieving quantity which is then subtracted from the inventory quantity of the data structure of the current intermediate node. The result is set as the new inventory quantity. In addition, the insufficient quantity is set as a new retrieving quantity (at step 1305 shown in FIG. 13). In the example shown in FIG. 6(B)→FIG. 7(C), the inventory quantity of the data structure of the node with the "color=red" attribute value is given as follows.

Inventory quantity=inventory quantity−(retrieving quantity−insufficient quantity)=600−(250−50)=400

Thus, the new retrieving quantity is given as follows.

Retrieving quantity=insufficient quantity=50

Thereafter, it is determined whether or not the insufficient quantity is "0" (at step 1306 shown in FIG. 13). In the above example, since the insufficient quantity is 50 (not 0), the determined result at step 1306 is No.

When the determined result at step 1306 is No, the next child node is searched (at step 1301 shown in FIG. 13). In the example shown in FIG. 6(A), since the child pointer list of the data structure of the node with the "color=red" attribute value stores at the third position a pointer to a node with a "size=S" attribute value, the determined result at step 1301 is Yes.

When the determined result at step 1301 is Yes, as described above, an inventory retrieving request is issued to the relevant child node (at step 1302 shown in FIG. 13). In this case, a retrieving condition and a retrieving quantity are input. An insufficient quantity is returned. In the example shown in FIG. 7(C), the retrieving condition and the retrieving quantity are as follows.

Retrieving condition: "Commodity A of size L"

Retrieving quantity: "50"

Thus, the inventory retrieving request process corresponding to the flowchart shown in FIG. 12 is called at step 1302 shown in FIG. 13.

First, it is determined whether or not the attribute of the data structure of the current node is included in the retrieving condition (at step 1201 shown in FIG. 12). In the example shown in FIG. 7(C), since the "size" attribute of the data structure of a node with a "size=S" attribute in a lower hierarchical level of the node with the "color=red" attribute value is included in the retrieving condition, the determined result at step 1201 is Yes.

When the determined result at step 1201 is Yes, it is determined whether or not the value of the data structure of the current node matches the retrieving condition (at step 1202 shown in FIG. 12). In the example shown in FIG. 7(C), since the "size=S" attribute value does not match the retrieving condition, the determined result at step 1202 is No.

When the determined result at step 1202 is No, the retrieving quantity is set to the insufficient quantity (at step 1206). Thus, the inventory retrieving request process at step 1302 shown in FIG. 13 is completed. In the example shown in FIG. 7(C), the insufficient quantity is 50.

In FIG. 13, at step 1303, it is determined whether or not the insufficient quantity equals the retrieving quantity. In the example shown in FIG. 7(C), when the flow is returned from the inventory retrieving request process for the child node with the "size=S" attribute value in a lower hierarchical level of the nose with the "color=red" attribute value, as described above, since the insufficient quantity (=50) is the retrieving quantity (=50), the determined result at step 1303 is Yes.

When the determined result at step 1303 is Yes, the next child node is searched (at step 1301 shown in FIG. 13). In the example shown in FIG. 7(C), since the child node pointer list of the data structure of the node with the "color=red" attribute value does not store at the third or later position a pointer to a child node, the determined result at step 1301 is No.

When the determined result at step 1301 is No, the process for the intermediate node at step 1204 shown in FIG. 12 is completed. In addition, the inventory retrieving request process at step 1302 shown in FIG. 13 is completed. In the example shown in FIG. 7(C), the inventory retrieving request process for the intermediate node with the "color=red" attribute value is completed. Thereafter, the flow returns to the next step of the process for the intermediate node at step 1302 corresponding to the flowchart for the node in the highest hierarchical level shown in FIG. 12.

In FIG. 13, at step 1303, it is determined whether or not the insufficient quantity equals the retrieving quantity. In the example shown in FIG. 7(C), when the flow is returned from the inventory retrieving request process for the child node with the "color=red" attribute value to the node in the highest hierarchical level, the insufficient quantity is 50. In addition, the retrieving quantity is 250 as shown in FIG. 6(A). Thus, the determined result at step 1303 is No.

When the determined result at step 1303 is No, as described above, the node update flag of the data structure of the current intermediate node is set to "1" (at step 1304 shown in FIG. 13). In the example shown in FIG. 7(C), the node update flag of the data structure of the node in the highest hierarchical level is set to "1".

Next, the insufficient quantity value is subtracted from the retrieving quantity which is then subtracted from the inventory quantity of the data structure of the current intermediate node. The result is set as the new inventory quantity. The insufficient quantity is set as a new retrieving quantity (at step 1305 shown in FIG. 13). In the example shown in FIG. 6(B)→FIG. 7(C), the inventory quantity of the data structure of the node in the highest hierarchical level is given as follows.

Inventory quantity=inventory quantity−(retrieving quantity−insufficient quantity)=800−(250−50)=600

The new retrieving quantity is given as follows.

Retrieving quantity−insufficient quantity=50

Thereafter, it is determined whether or not the insufficient quantity is 0 (at step 1306 shown in FIG. 13). In the example, since the insufficient quantity is 50 (not 0), the determined result at step 1306 is No.

When the determined result at step 1306 is No, the next child node is searched (at step 1301 shown in FIG. 13). In the example shown in FIG. 7(C), since the child node pointer list of the data structure of the node in the highest hierarchical level stores at the second position a pointer to a node with a "color=blue" attribute value, the determined result at step 1301 is Yes.

When the determined result at step 1301 is Yes, as described above, an inventory retrieving request is issued to the relevant child node (at step 1302 shown in FIG. 13). In this case, a retrieving condition and a retrieving quantity are input. An insufficient quantity is returned. In the example shown in FIG. 7(C), the retrieving condition and the retrieving quantity are as follows.

Retrieving condition: "Commodity A of size L"
Retrieving quantity: "50"

Thus, the inventory retrieving request process corresponding to the flowchart shown in FIG. 12 is called again at step 1302 shown in FIG. 13.

First, it is determined whether or not the attribute of the data structure of the current node is included in the retrieving condition (at step 1201 shown in FIG. 12). In the example shown in FIG. 7(C), since the "color" attribute of the data structure of the node with the "color=blue" attribute value is not included in the retrieving condition, the determined result at step 1201 is No.

When the determined result at step 1201 is No, it is determined whether or not the current node is a terminal node (at step 1203). In the example shown in FIG. 7(C), since the node with the "color=blue" attribute value is not a terminal node, the determined result at step 1203 is No.

When the determined result at step 1203 is No, the process for the intermediate node is executed (at step 1204 shown in FIG. 12). In this case, a retrieving condition and a retrieving quantity are input. An insufficient quantity is returned. In the example shown in FIG. 6(A), the retrieving condition and the retrieving quantity are as follows.

Retrieving condition: "Commodity A of size L"
Retrieving quantity: "50"

Thus, the process for the intermediate node corresponding to the flowchart shown in FIG. 13 is called again at step 1204 shown in FIG. 12.

First, a child node is searched (at step 1301 shown in FIG. 13). In the example shown in FIG. 7(C), since the child node pointer list of the data structure of the node with the "color=blue" attribute value stores at the top a pointer to a node with a "size=L" attribute value, the determined result at step 1301 is Yes.

When the determined result at step 1301 is Yes, as described above, an inventory retrieving request is issued to the relevant child node (at step 1302 shown in FIG. 13). In this case, a retrieving condition and a retrieving quantity are input. A retrieving quantity is returned. In the example shown in FIG. 6(A), the retrieving condition and the retrieving quantity are as follows.

Retrieving condition: "Commodity A of size L"
Retrieving quantity: "50"

Thus, the inventory retrieving request process corresponding to the flowchart shown in FIG. 12 is called again at step 1302 shown in FIG. 13.

First, it is determined whether or not the attribute of the data structure of the current node is included in the retrieving condition (at step 1201 shown in FIG. 12). In the example shown in FIG. 7(C), since the "size" attribute of the data structure of the node with the "size=L" attribute value in a lower hierarchical level of the node with the "color=blue" attribute value is included in the retrieving condition, the determined result at step 1201 is Yes.

When the determined result at step 1201 is Yes, it is determined whether or not the value of the data structure of the current node matches the retrieving condition (at step 1202 shown in FIG. 12). In the example shown in FIG. 7(C), since the "size=L" attribute matches the retrieving condition, the determined result at step 1202 is Yes.

When the determined result at step 1202 is Yes, it is determined whether or not the current node is a terminal node (at step 1203). In the example shown in FIG. 7(C), since the node with the "size=L" attribute value in a lower hierarchical level of the node with the "color=blue" attribute value is a terminal node, the determined result at step 1203 is No.

When the determined result at step 1203 is Yes, the process for the terminal node is executed (at step 1205 shown in FIG. 12). In this case, a retrieving condition and a retrieving quantity are input. An insufficient quantity is returned. In the example shown in FIG. 7(C), the retrieving condition and the retrieving quantity are as follows.

Retrieving condition: "Commodity A of size L"
Retrieving quantity: "50"

The process for the terminal node is executed corresponding to a flowchart shown in FIG. 14.

First, it is determined whether or not the inventory quantity of the data structure of the terminal node is larger than the retrieving quantity (at step 1401 shown in FIG. 14). In the example shown in FIG. 7(C), since the inventory quantity (=100) of the data structure of the terminal node with the "size=L" attribute value in a lower hierarchical level of the node with the "color=blue" attribute value is larger than the attributing quantity (=50), the determined result at step 1401 is Yes.

When the determined result at step 1401 is Yes, the value of which the retrieving quantity is subtracted from the inventory quantity is set as a new inventory quantity. In addition, the insufficient quantity is set to "0" (at step 1402 shown in FIG. 14). In the example shown in FIG. 7(C) →FIG. 7(D), in the process for the terminal node with the "size=L" attribute value in a lower hierarchical level of the node with the "color=blue" attribute value, the inventory quantity and the insufficient quantity are given as follows.

Inventory quantity=inventory quantity−retrieving quantity=100−50=50

Insufficient quantity=0

Thereafter, the node update flag of the data structure of the terminal node is set to "1" (at step 1401 shown in FIG. 14). Thus, the process for the terminal node at step 1205 shown in FIG. 12 is completed. In addition, the inventory retrieving request process at step 1302 shown in FIG. 13 is completed.

In FIG. 13, at step 1303, it is determined whether or not the insufficient quantity equals the retrieving quantity. In the example shown in FIG. 7(D), when the flow is returned from the inventory retrieving request process for the child node with the "size=L" attribute value in a lower hierarchical level of the node with the "color=blue" attribute value, as described above, since the insufficient quantity (=0) does not match the retrieving quantity (=50), the determined result at step 1303 is No.

When the determined result at step 1303 is No, the node update flag of the data structure of the current intermediate node is set to "1" (at step 1304 shown in FIG. 13). In the example shown in FIG. 7(D), the node update flag of the data structure of the node with the "color=blue" attribute value is set to "1".

Next, the the insufficient quantity value is subtracted from the retrieving quantity which is then subtracted from the inventory quantity of the data structure of the current intermediate node. The result is set as a new inventory quantity. In addition, the insufficient quantity is set as a new retrieving quantity (at step 1305 shown in FIG. 13). In the example shown in FIG. 7(C)→FIG. 7(D), the inventory quantity of the data structure of the node with the "color=blue" attribute value is given as follows.

Inventory quantity=inventory quantity−(retrieving quantity−insufficient quantity)=200−(50−0)=150

Thus, the new retrieving quantity is given as follows.

Retrieving quantity=insufficient quantity=0

Thereafter, it is determined whether or not the insufficient quantity is 0 (at step 1306 shown in FIG. 13). In the example, since the insufficient quantity is 0, the determined result at step 1306 is Yes.

When the determined result at step 1306 is Yes, the process for the intermediate node at step 1204 shown in FIG. 12 is completed. In addition, the inventory retrieving request process at step 1302 shown in FIG. 13 is completed. In the example shown in FIG. 7(D), the inventory retrieving request process for the intermediate node with the "color= blue" attribute value is completed. Thereafter, the flow returns to the next step of the process for the intermediate node at step 1302 corresponding to the flowchart for the node in the highest hierarchical level shown in FIG. 12.

In FIG. 13, at step 1303, it is determined whether or not the insufficient quantity equals the retrieving quantity. In the example shown in FIG. 7(D), when the flow is returned from the inventory retrieving request process for the child node with the "color=blue" attribute value in a lower hierarchical level of the node in the highest hierarchical level, the insufficient quantity is 0 and the retrieving quantity is 50 as shown in FIG. 7(C). Thus, the determined result at step 1303 is Yes.

When the determined result at step 1303 is No, as described above, the node update flag of the data structure of the current intermediate node is set to "1" (at step 1304 shown in FIG. 13). In the example shown in FIG. 7(D), the node update flag of the data structure of the node in the highest hierarchical level is set to "1" again.

Next, the insufficient quantity value is subtracted from the retrieving quantity, which is then subtracted from the inventory quantity of the data structure of the current intermediate node. The result is set as the new inventory quantity. In addition, the insufficient quantity is set as a new retrieving quantity (at step 1305 shown in FIG. 13). In the example shown in FIG. 7(C)→FIG. 7(D), the inventory quantity of the data structure of the node in the highest hierarchical level is given as follows.

Inventory quantity=inventory quantity−(retrieving quantity−insufficient quantity)=600−(50−0)=550

The new retrieving quantity is calculated as follows.

Retrieving quantity=insufficient quantity=0

Thereafter, it is determined whether or not the insufficient quantity is 0 (at step 1306 shown in FIG. 13). In the example, since the insufficient quantity is 0, the determined result at step 1306 is Yes.

When the determined result at step 1306 is Yes, the process for the intermediate node at step 1204 shown in FIG. 12 is completed. In addition, the inventory retrieving request process at step 1302 shown in FIG. 13 is completed. In the example shown in FIG. 7(D), the inventory retrieving request process for the node in the highest hierarchical level is completed. The flow returns to the next step of the inventory retrieving process corresponding to the flowchart shown in FIG. 11.

In FIG. 11, it is determined whether or not the insufficient quantity is 0 (at step 1102 shown in FIG. 11). In the example shown in FIG. 7(D), since the insufficient quantity is 0, the determined result at step 1102 is Yes.

When the determined result at step 1102 is Yes, a message that represents that the inventory retrieving process has been successfully completed is sent. Thus, the inventory retrieving process of the inventory retrieving unit 104 is completed.

On the other hand, when the determined result at step 1102 is No, all node updates are discarded (at step 1103 shown in FIG. 11). The content of the inventory information tree structure storing unit 103 is not altered.

Thereafter, a message that represents that the inventory retrieving process has been unsuccessfully terminated is sent. Thus, the inventory retrieving process of the inventory retrieving unit 104 is terminated.

In the case that the attribute of the data structure of the current intermediate node matches the retrieving condition (namely, the determined result at step 1201 shown in FIG. 12 is Yes→the determined result at step 1202 is Yes→the determined result at step 1203 is No→step 1204), in an inventory retrieving request process for a child node of an intermediate node (at step 1302 shown in FIG. 12 and in the flowchart shown in FIG. 12), if the child node is a terminal node, even if the attribute of the data structure of the terminal node is not included in the retrieving condition, the inventory retrieving process is executed for the terminal node (at step 1205 shown in FIG. 12 and the flowchart shown in FIG. 14).

The above-described inventory retrieving process for a terminal node is executed until the inventory quantity thereof becomes 0.

In the case that the attribute and value of the data structure of an intermediate node match a retrieving condition, when an inventory retrieving request process for a terminal node that is a child node of the intermediate node is executed, if the attribute of the data structure of the terminal node is not included in the retrieving condition, the system may be structured in such a manner that the inventory retrieving process is performed up to the lower limit of a predetermined inventory quantity.

Figure 15:
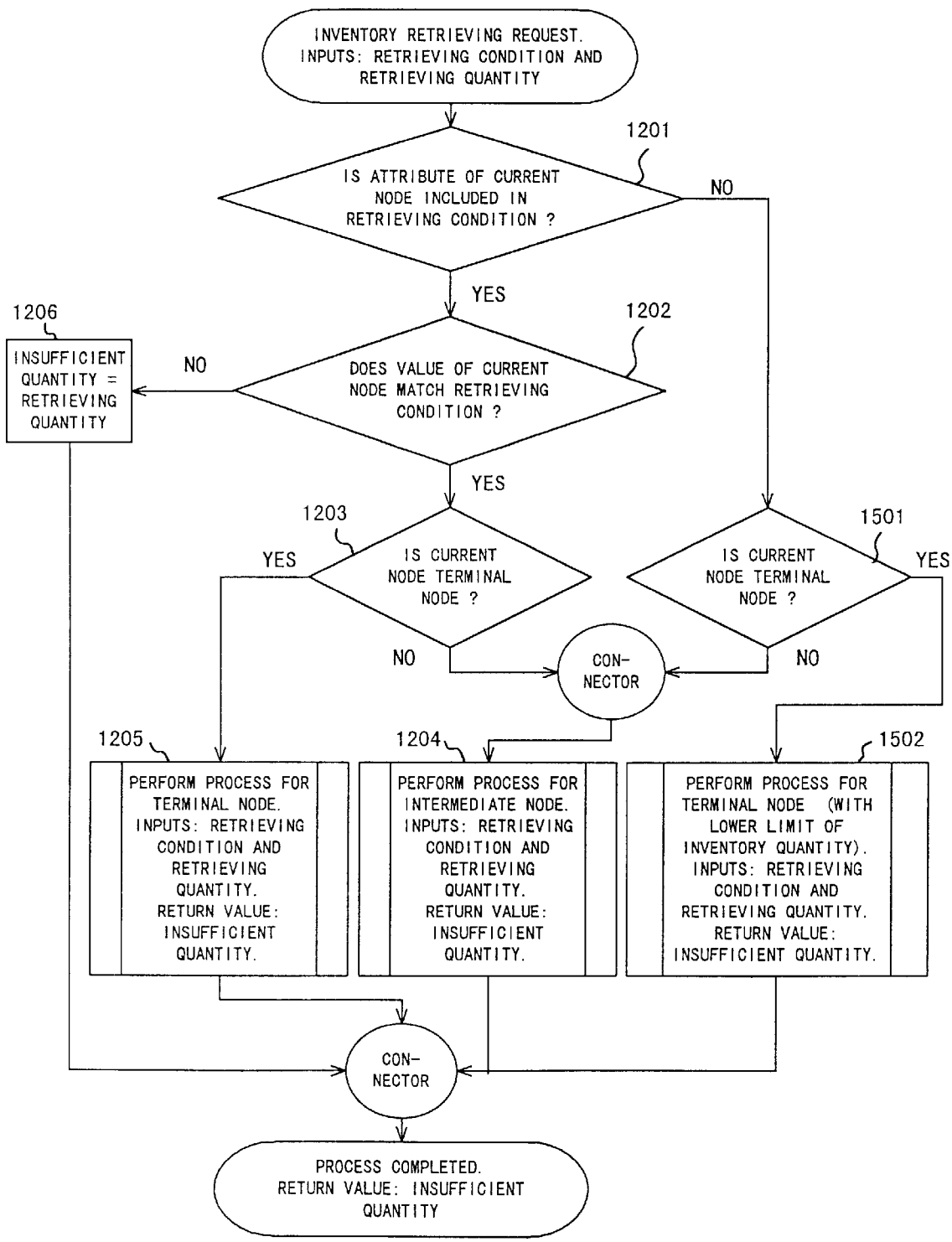
FIG. 15 is a flowchart showing the inventory retrieving request process that can be distributed.

FIG. 15 is a flowchart showing an inventory retrieving request process that can be distributed.

The flowchart shown in FIG. 15 is similar to that shown in FIG. 12. In FIG. 15, similar steps to those in FIG. 12 are denoted by similar reference numerals.

In FIG. 15, in the case that the attribute and value of the data structure of an intermediate node match a retrieving condition (the determined result at step 1501 shown in FIG. 15 is Yes→the determine result at step 1502 is Yes→the determined result at step 1503 is No→step 1504), when an inventory retrieving request process for a child node of the intermediate node is performed (at step 1302 shown in FIG. 13 and in the flowchart shown in FIG. 15), if the attribute of the data structure of the child node is not included in the attributing condition (the determined result at step 1201 shown in FIG. 15 is No) and the current node is a terminal node (at step 1501 shown in FIG. 15), the process for the terminal node is performed up to the lower limit of the inventory quantity unlike with step 1205 (at step 1502 shown in FIG. 15).

FIG. 16 is a flowchart showing the process for the terminal node at step 1502 shown in FIG. 15.

First, it is determined whether or not the value of which a predetermined value of the lower limit is subtracted from the inventory quantity of the data structure of the terminal node is larger than the retrieving quantity (at step 1601 shown in FIG. 16).

When the determined result at step 1601 is Yes, as with the case at step 1402, the value of which the retrieving quantity is subtracted from the inventory quantity is set as a new inventory quantity. In addition, the insufficient quantity is set to 0 (at step 1602 shown in FIG. 16).

When the determined result at step 1601 is No, the value of which the lower limit of the inventory quantity is subtracted from the inventory quantity is subtracted from the retrieving quantity. The result is set as an insufficient quantity. The new inventory quantity is set as a lower limit of the inventory quantity (at step 1603 shown in FIG. 16).

The process at step 1604 is the same as the process at step 1404 shown in FIG. 14.

As described above, since the process for the terminal node is executed up to the lower limit of the inventory quantity, the inventory retrieving process is prevented from being performed only for a particular node. Thus, the inventory retrieving process can be distributed.

The inventory stocking process is executed by the inventory stocking unit 105 for the inventory information tree structure stored in the inventory information tree structure storing unit 103.

In the inventory stocking process, nodes that satisfy a stocking condition are one terminal node and intermediate nodes in higher hierarchical levels thereof.

Figure 17:
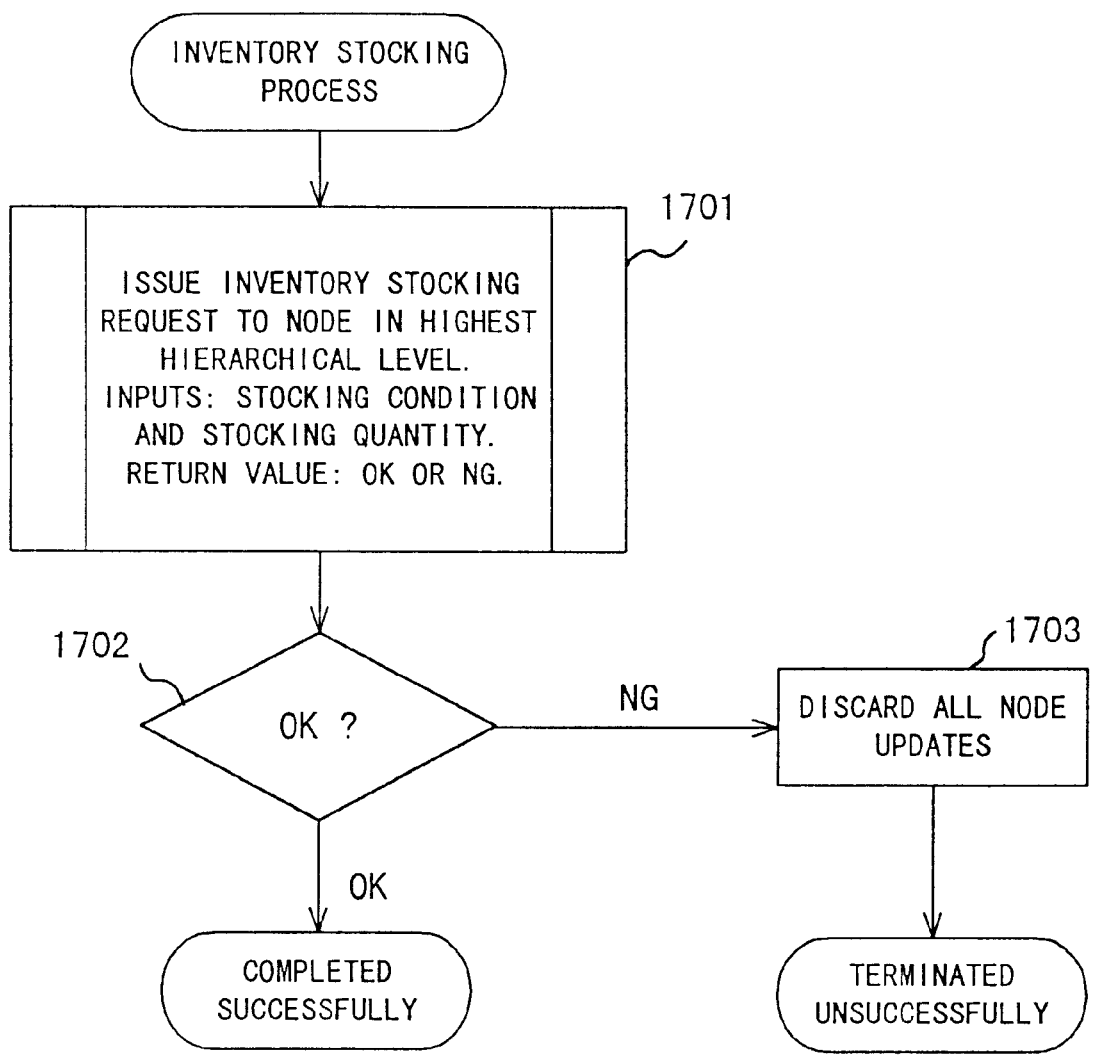
FIG. 17 is a flowchart showing a main flow of an inventory stocking process.
Figure 18:
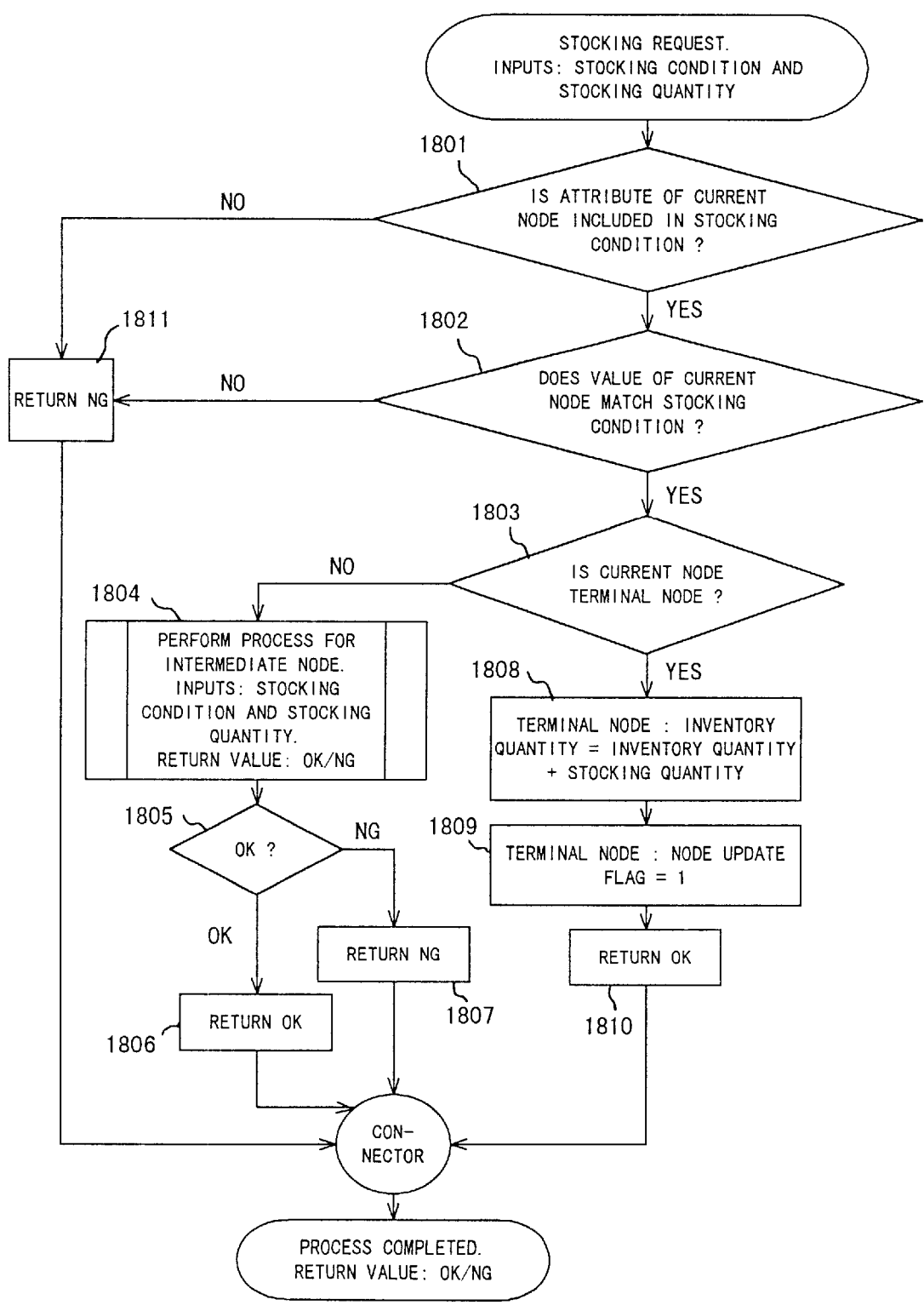
FIG. 18 is a flowchart showing an inventory stocking request process.
Figure 19:
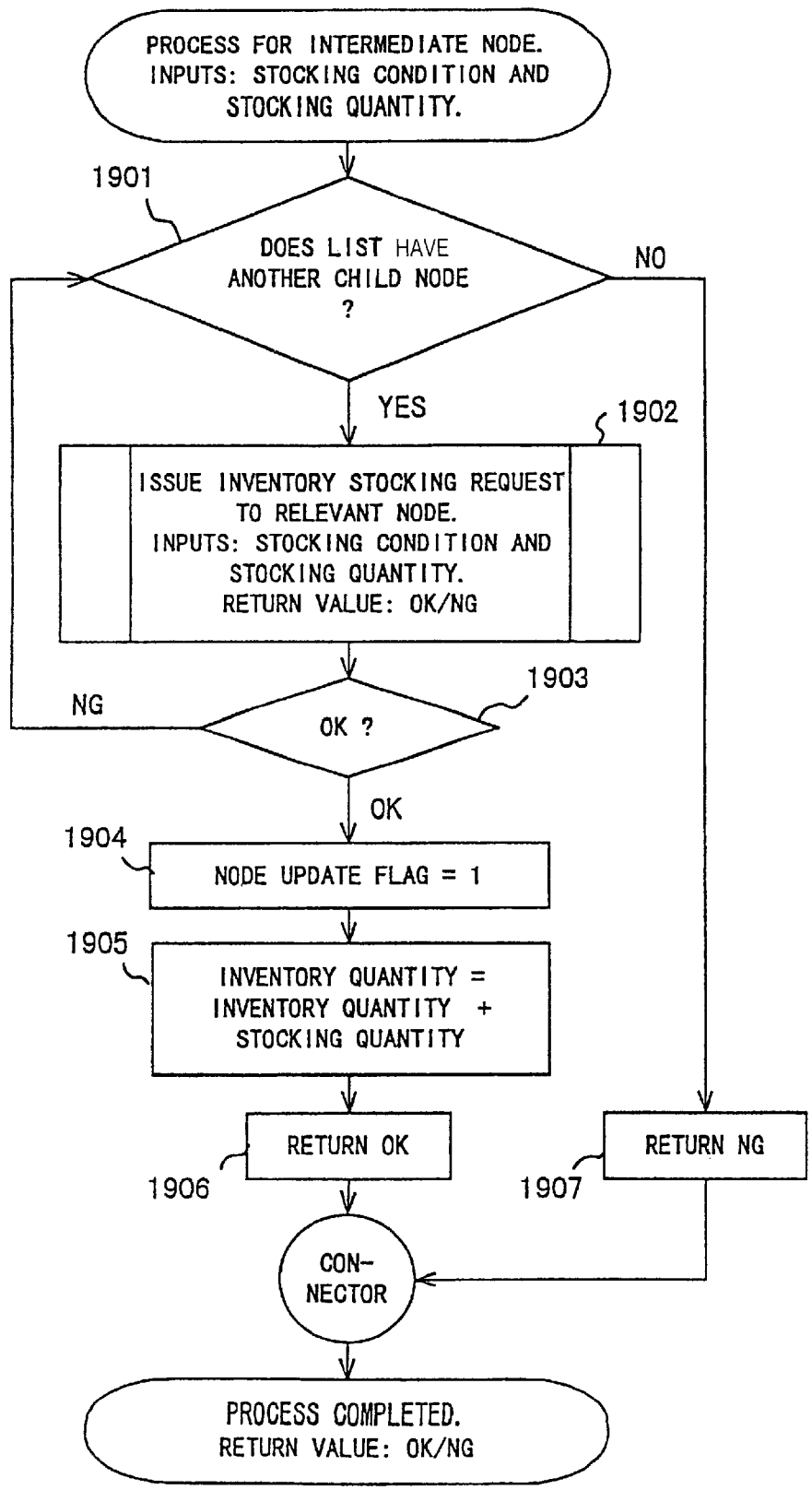
FIG. 19 is a flowchart showing a process for an intermediate node in the inventory stocking process.

FIGS. 17 to 19 are flowcharts showing the process of the inventory stocking unit 105. FIG. 17 is a flowchart showing a main flow of the process.

First, an inventory stocking request is issued to a node in the highest hierarchical level (at step 1701 shown in FIG. 17). In this case, a stocking condition and a stocking quantity are input. An OK or NG (No Good) is returned.

FIG. 18 is a flowchart showing an inventory stocking request process called at step 1701 shown in FIG. 17.

In the inventory stocking request process, when the attribute and value of the data structure of the current node do not match the stocking condition, a message NG is immediately returned (the determined result at step 1801 shown in FIG. 18 is No→step 1811; the determined result at step 1801 is Yes→the determined result at step 1802 is No→step 1811).

In contrast, when the attribute and value of the data structure of the current node match the stocking condition and the current node is an intermediate node, a process for an intermediate node is executed (the determined result at step 1801 shown in FIG. 18 is Yes–the determined result at step 1802 is Yes→the determined result at step 1803 is No→step 1804). In this case, a stocking condition and a stocking quantity are input. OK or NG is returned.

FIG. 19 is a flowchart showing a process for an intermediate node called at step 1804 shown in FIG. 18.

In the process for the intermediate node, a child node is searched from the child node pointer list of the data structure of the intermediate node. In addition, the inventory stocking request process is executed for a relevant child node (the determined result at step 1901 shown in FIG. 19 is Yes→step 1902→step 1903→step 1901).

The inventory stocking request process for the relevant child node is executed again corresponding to the flowchart shown in FIG. 18. When the relevant child node is an intermediate node, the process for the intermediate node is recursively executed (the determined result at step 1801 shown in FIG. 18 is Yes →the determined result at step 1802 is Yes→the determined result at step 1803 is No→step 1804).

On the other hand, when the child node is a terminal node and the attribute and value of the data structure thereof match the stocking condition (the determined result at step 1801 shown in FIG. 18 is Yes →the determined result at step 1802 is Yes→the determined result at step 1803 is Yes), the stocking quantity is added to the inventory quantity of the data structure of the terminal node (at step 1808 shown in FIG. 18). The node update flag of the data structure is set to "1" (at step 1809 shown in FIG. 18). A message OK is returned to the parent node (at step 1810 shown in FIG. 18).

When the message OK is returned from the terminal node, in the process for the intermediate node shown in FIG. 19, the determined result at step 1903 is Yes. The node update flag of the data structure of the intermediate node is set to "1" (at step 1904 shown in FIG. 19). The stocking quantity is added to the inventory quantity of the data structure (at step 1905 shown in FIG. 19). Thus, a message OK is returned (at step 1906 shown in FIG. 19).

In the process for the intermediate node, when a message OK is not returned from any child node and thereby the determined result at step 1901 is No, a message NG is returned (at step 1907 shown in FIG. 19).

When the message OK is returned in the process for the intermediate node, a message OK is returned to the parent node that causes the intermediate node to execute the inventory stocking request process (step 1804 shown in FIG. 18→the determined result at step 1805 is Yes (OK)→step 1806). In contrast, when a message NG is returned, a message NG is returned to the parent node that causes the intermediate node to execute the inventory stocking request process (step 1804 shown in FIG. 18→the determined result at step 1805 is No (NG)→step 1807).

As described above, when the result of the inventory stocking process is returned to the node in the highest hierarchical level of the inventory information tree structure, the inventory stocking request process at step 1701 shown in FIG. 17 is completed. Next, it is determined whether or not the message OK is returned (at step 1702 shown in FIG. 17).

When the determined result at step 1702 is Yes (OK), a message that represents that the inventory stocking process has been successfully completed is sent. Thus, the inventory stocking process of the inventory stocking unit 105 is completed.

On the other hand, when the determined result at step 1702 is No (NG), all node updates are discarded (at step 1703 shown in FIG. 17). Thus, the content of the inventory information tree-on memory structure storing unit 103 is not varied.

Thereafter, a message that represents that the inventory stocking process has been unsuccessfully terminated is sent. Thus, the inventory stocking process of the inventory stocking unit 105 is terminated.

The updated content of the inventory information tree structure stored in the inventory information tree on-memory structure storing unit 103 is reflected to the inventory information tree DB stored in the inventory information tree DB storing unit 101 by the inventory information tree DB updating unit 106 at predetermined intervals.

Figure 24:
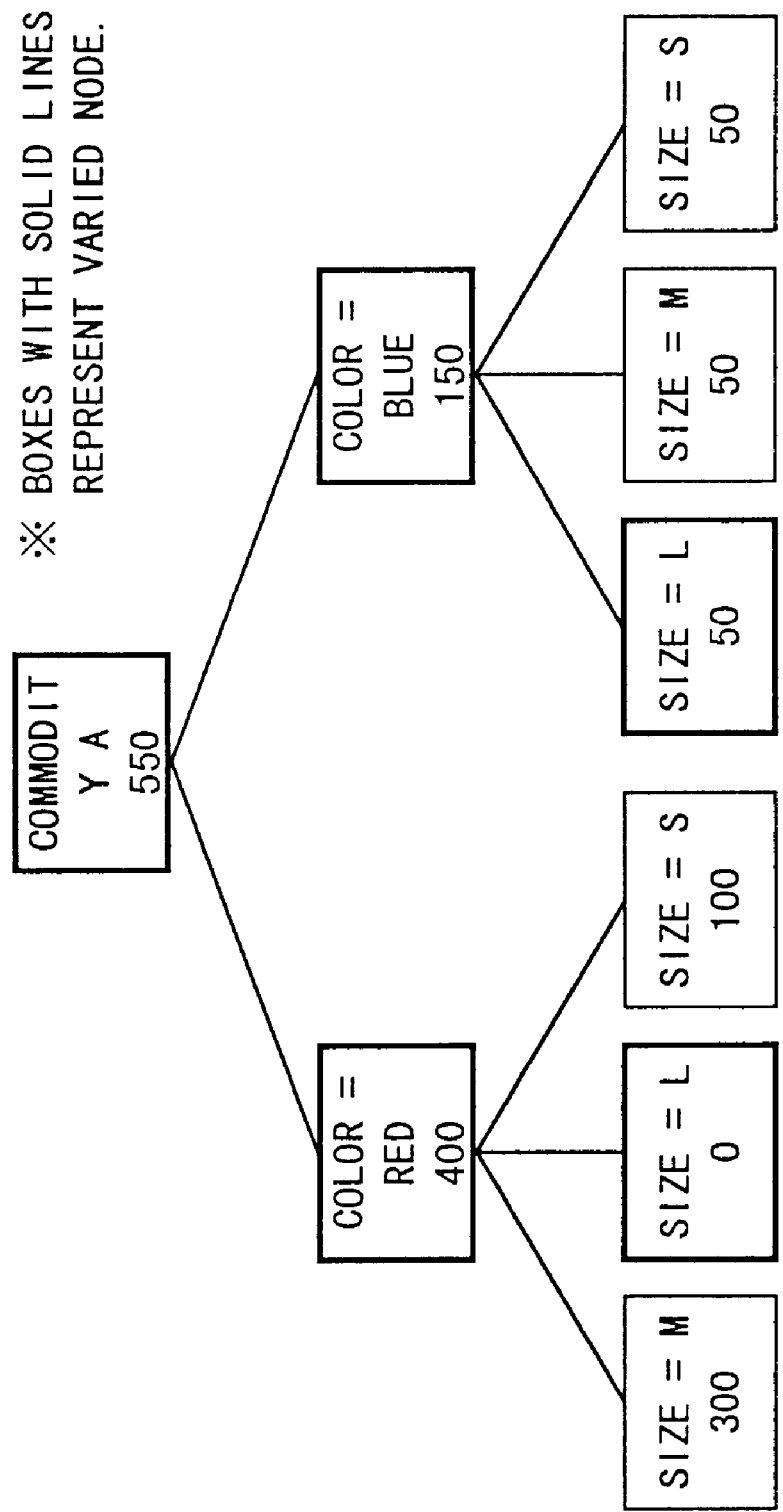
FIG. 24 is a schematic diagram for explaining the inventory updating process.

As described above, the node update flag stored in the data structure of each node in the inventory information tree on-memory structure is set to "1" when the inventory quantity of the relevant node is updated by the inventory retrieving unit 104 and the inventory stocking unit 105. The inventory information tree DB updating unit 106 executes the SQL statement for updating the data to the inventory information tree DB table for a node with node update flag=1 in the inventory information tree on-memory structure shown in FIG. 24. Thus, the inventory information tree DB and the inventory information tree structure can be effectively matched.

Figure 20:
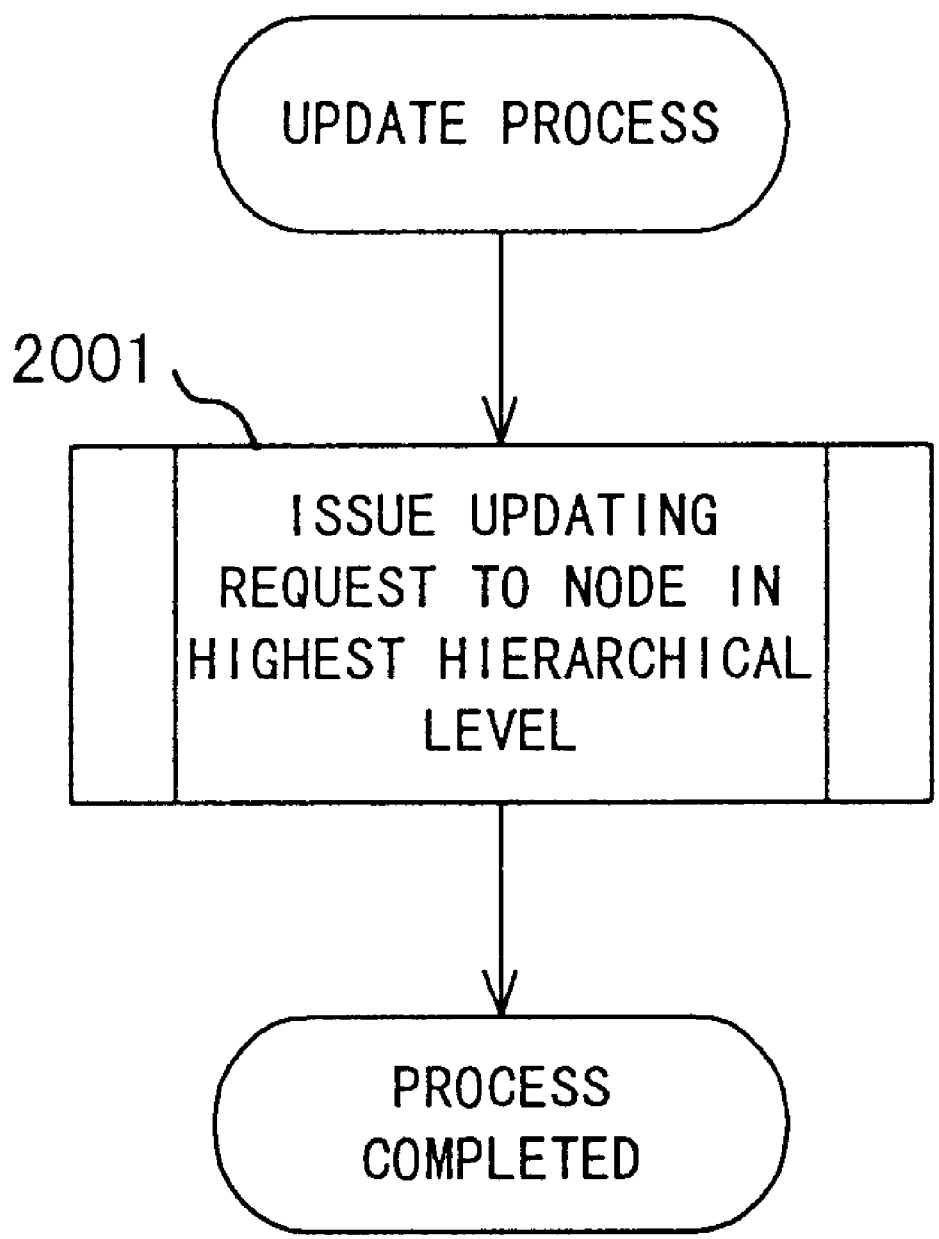
FIG. 20 is a flowchart showing a main flow of an inventory updating process.

FIGS. 20 to 23 are flowcharts showing a process of the inventory information tree DB updating unit 106. FIG. 20 is a flowchart showing a main flow of the process.

First, an inventory updating request is issued to a node in the highest hierarchical level (at step 2001 shown in FIG. 20).

Figure 21:
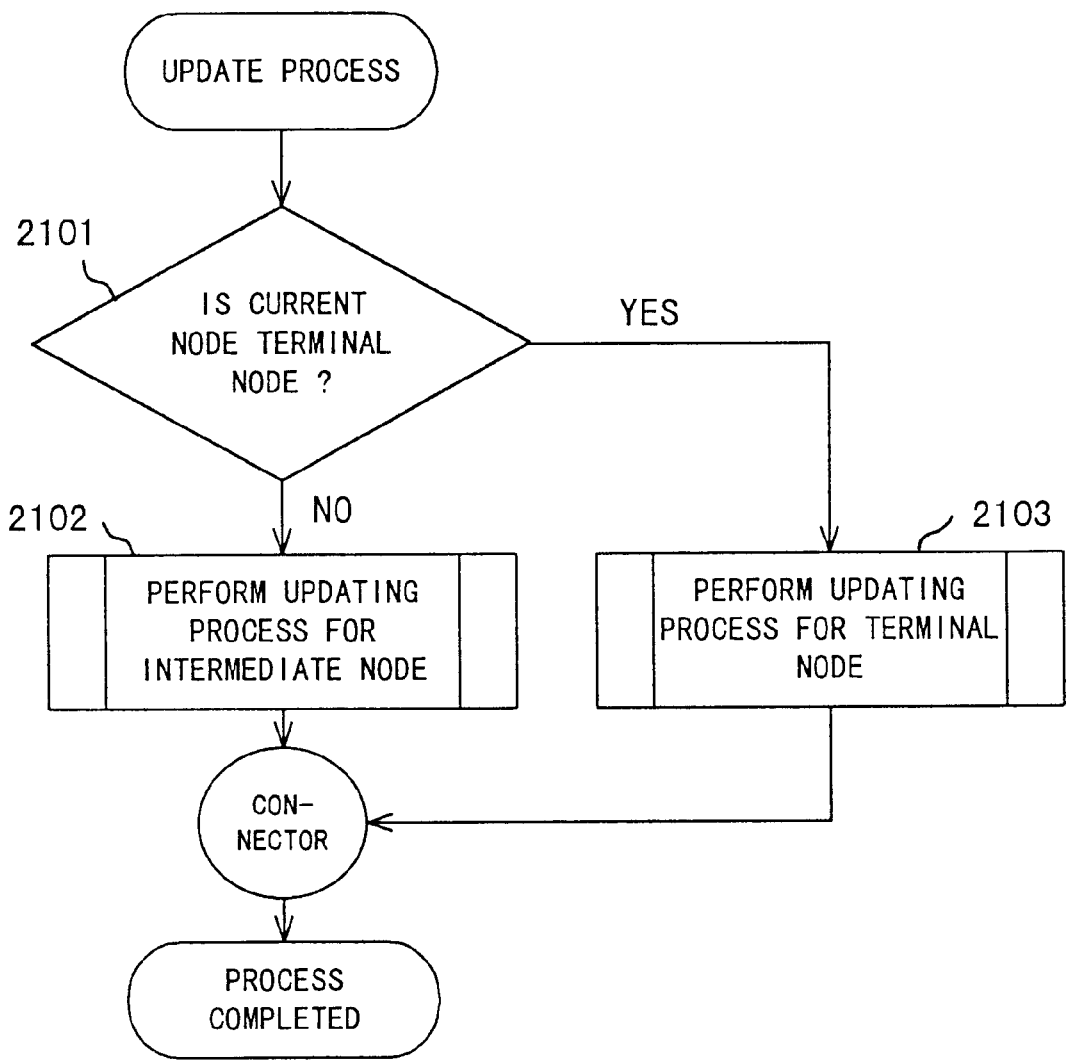
FIG. 21 is a flowchart showing an inventory updating request process.

FIG. 21 is a flowchart showing the inventory updating request process called at step 2001 shown in FIG. 20.

In the inventory updating request process, when the current node is an intermediate node, the inventory updating process for the intermediate node is executed (the determined result at step 2101 shown in FIG. 21 is No→step 2102). When the current node is a terminal node, the inventory updating process for the terminal node is executed (the determined result at step 2101 is Yes→step 2103).

Figure 22:
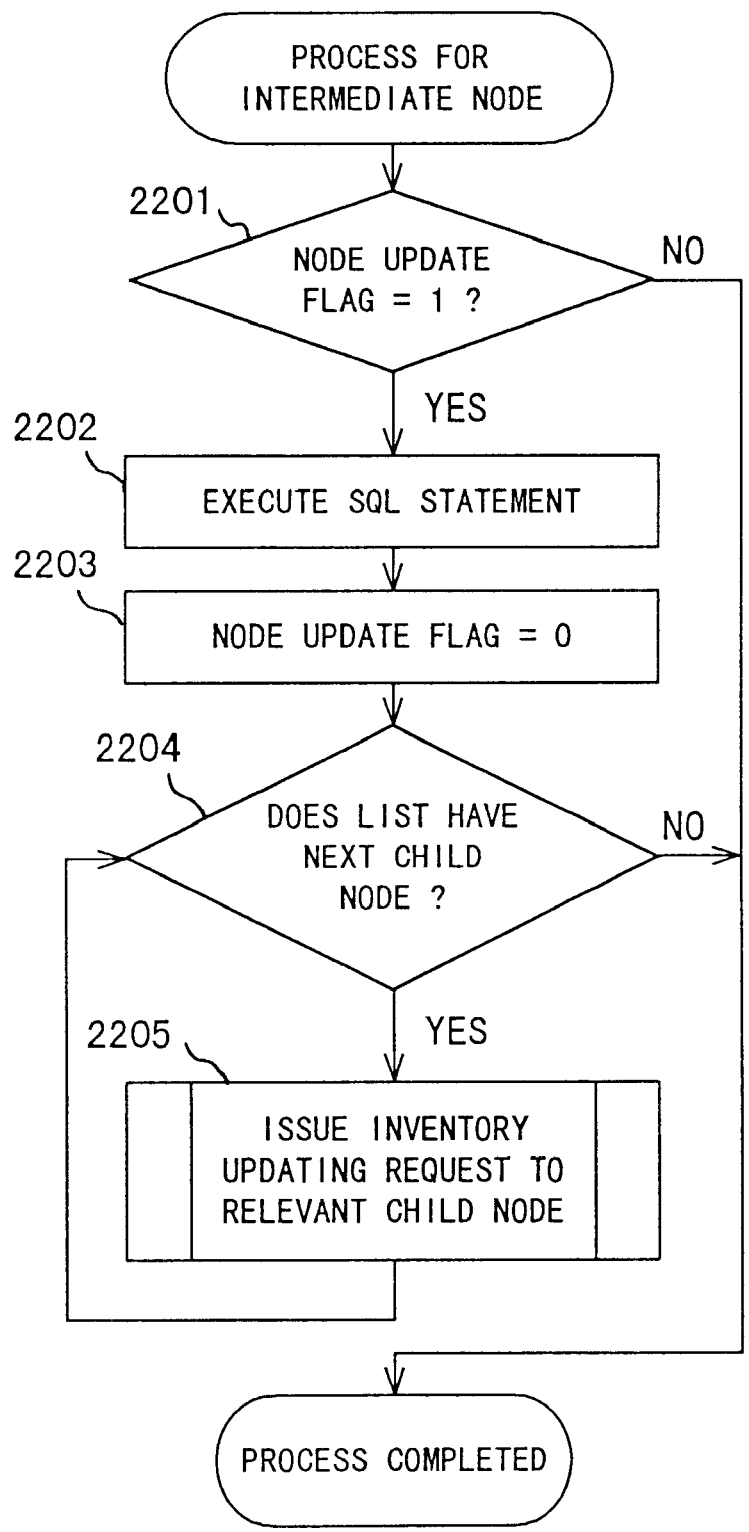
FIG. 22 is a flowchart showing a process for an intermediate node in the inventory updating process.

FIG. 22 is a flowchart showing the inventory updating process for the intermediate node called at step 2102 shown in FIG. 21.

In the inventory updating process for the intermediate node, when the node update flag of the data structure of the current node is "1", the following SQL statement for the node is issued (determined result at step 2201 shown in FIG. 22 is Yes→step 2202).

update TABLE NAME set INVENTORY QUANTITY=
    <INVENTORY QUANTITY>where ID=<NODE ID>

In the SQL statement, <INVENTORY QUANTITY>and <NODE ID>are the inventory quantity and node ID stored in the data structure.

Thereafter, the node update flag stored in the data structure of the current node is set to "0" (at step 2203).

Next, a child node is searched from the child node pointer list of the data structure of the current node. The inventory updating request process is executed for a relevant child node (the determined result at step 2204 shown in FIG. 22 is Yes→step 2205→step 2204).

The inventory updating request process for the relevant child node corresponding to the flowchart shown in FIG. 21 is executed again. When the relevant child node is an intermediate node, the inventory updating process for the intermediate node is recursively executed (the determined result at step 2101 shown in FIG. 21 is No→step 2202).

On the other hand, in the inventory updating request process, when the current node is a terminal node, the inventory updating process for the terminal node is executed (the determined result at step 2101 is Yes→step 2103).

Figure 23:
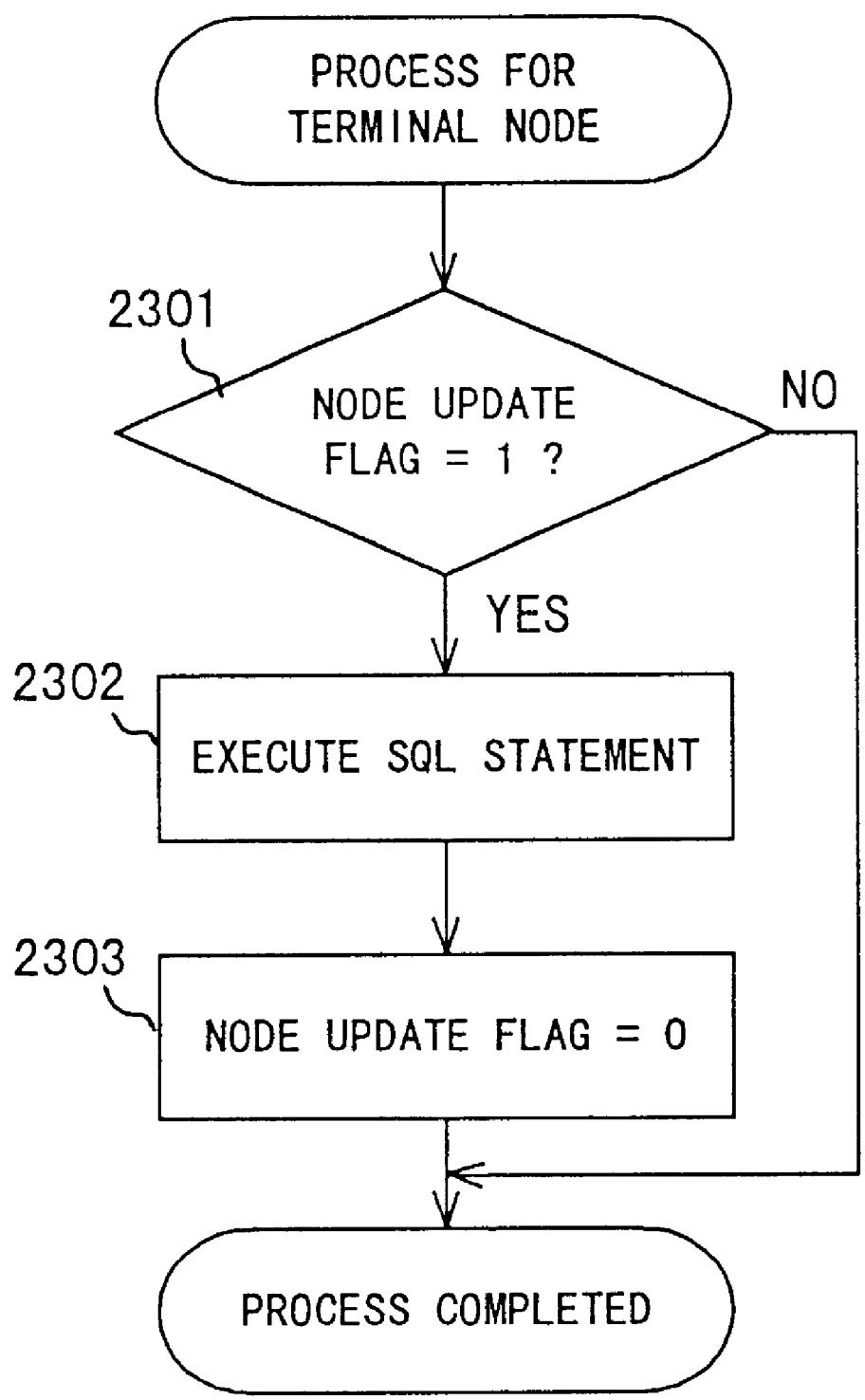
FIG. 23 is a flowchart showing a process for a terminal node in the inventory updating process.

FIG. 23 is a flowchart showing the inventory updating process for the terminal node called at step 2103 shown in FIG. 21.

In the inventory updating process for the terminal node, no operation is performed unless the node update flag stored in the data structure of the current node is "1". When the node update flag is "1", as with the case of an intermediate node, the following SQL statement is executed (the determined result at step 2301 shown in FIG. 23 is Yes→step 2302).

update TABLE NAME set INVENTORY QUANTITY=
    <INVENTORY QUANTITY>where ID=<NODE ID>

Thereafter, the node update flag stored in the data structure of the current node is set to "0" (at step 2303).

After the inventory updating process has been recursively completed and the flow returns to the inventory updating request process for the node in the highest hierarchical level, the inventory updating process at step 2001 shown in FIG. 20 is completed. Thus, the inventory updating process of the inventory information tree DB updating unit 106 is completed.

FIG. 25(A) is a table showing an inventory information tree DB stored in the inventory information tree DB storing unit 101 according to a second embodiment of the present invention.

In the inventory information tree DB according to the first embodiment of the present invention shown in FIG. 2 or 9, a smaller value of node ID is designated to a node in a higher hierarchical level of the inventory information tree. In addition, a smaller node ID is designated to a node at a leftmost position in the same hierarchical level. Thus, a navigation of the inventory retrieving process based on the inventory information tree is configured so that the node ID which has a smaller value will be higher in the order of priority.

On the other hand, in the second embodiment shown in FIG. 25(A), the priority between different hierarchical levels is defined with the relation of settings in a parent ID field. Moreover, the priority in the same hierarchical level is defined with the relation of settings in a preceding node ID field.

Thus, corresponding to the settings in the preceding node ID field, the priority of the navigation can be defined as shown in FIG. 25(B).

With such a structure, as shown in FIG. 26, a node with any priority can be easily added to any hierarchical level.

The present invention can be applied for a storage medium from which a computer reads a program that causes the computer to perform the same function as that accomplished by each structural unit of the embodiment.

Figure 27:
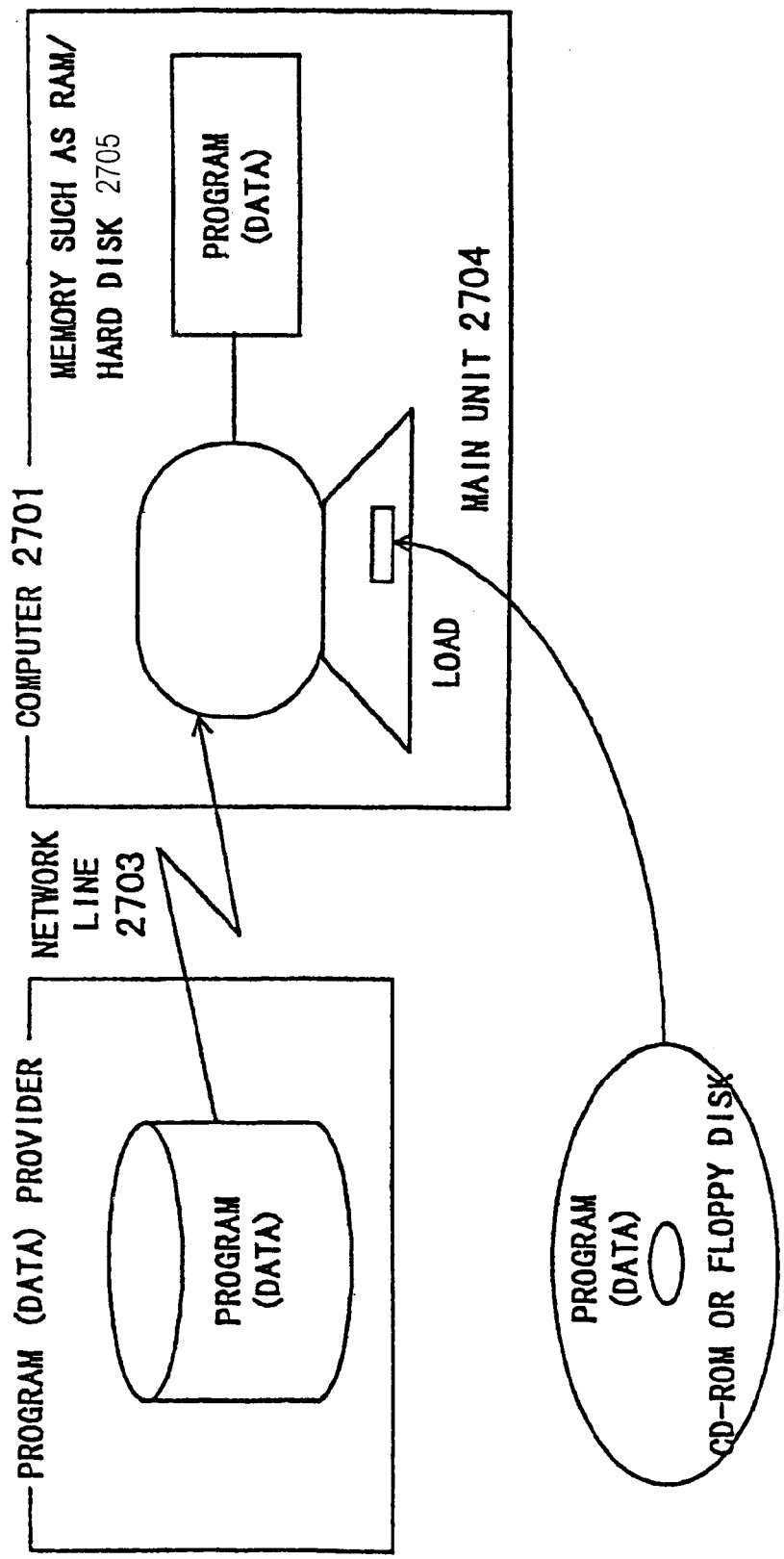
FIG. 27 is a schematic diagram for explaining a storage medium for recording a program that allows an embodiment of the present invention to be accomplished.

In this case, as shown in FIG. 27, a program that accomplishes each function of each embodiment of the present invention is loaded to a memory (RAM, hard disk, or the like 2705) of a main unit 2704 of an NMS server 2701 with a portable storage medium 2702 such as a floppy disk, a CD-R disc, an optical disc, a removable disc, or the like or through a network line 2703. Thereafter, the program is executed.

What is claimed is:

1. An inventory managing method for automatically performing an inventory managing process for a management object, comprising:

creating a tree of nodes formed in a plurality of levels, each level corresponding to a different attribute, and each node storing an attribute value and an inventory quantity corresponding to a number of items with the respective attribute value;

designating attributes and attribute values of an object as a retrieving condition; and executing an inventory retrieving process updating the inventory quantity of each node while searching each node corresponding to the retrieving condition, wherein each node with priority corresponding to a horizontal position of each node in levels corresponding to attributes that are not included in the retrieving condition is searched during searching each node on the binary tree data, wherein a tree structure is traced to a level corresponding to an attribute that is not included in the retrieving condition, and a retrieving process for supplying a deficiency is performed at a node of the second highest priority in the level when the inventory quantity of a terminal node is insufficient to supply a required quantity, wherein the inventory retrieving process is automatically performed according to a predetermined rule even in the case where the retrieving condition of the inventory retrieving process is not part of a query, by determining the attribute value of the management object.

2. An inventory managing apparatus comprising:

a database table generator generating nodes in a tree structure, wherein each of the nodes includes an attribute, an attribute value, an inventory quantity of the attribute value, and a relation of the link to another node; and an inventory retrieving unit searching each node on the tree structure corresponding to a retrieving condition defined with a combination of the attribute and the attribute value wherein each node with a priority corresponding to a position of each node in each level corresponding to attributes that are not included in the retrieving condition is searched, wherein the inventory retrieving process is automatically performed according to a predetermined rule even in the case where the retrieving condition of the inventory retrieving process is not part of a query, by determining the attribute value of the management object.

3. The apparatus as recited in claim 2, further comprising:

an inventory stocking unit executing an inventory stocking process updating the inventory quantity of each node while searching each node on the tree structure corresponding to a stocking condition defined with a combination of the attribute and an attribute value.

4. The apparatus as set forth in claim 2, further comprising:

a tree structure creating unit creating tree structure data from a database table, wherein said inventory retrieving unit executes the inventory retrieving process for the tree structure data.

5. The apparatus as set forth in claim 4, wherein each record further comprises:

an identification information field for storing identification information having a value corresponding to a position of the node on the tree structure, wherein said tree structure data on creating unit develops the tree structure data from said database table to a memory unit corresponding to contents of an identification information field.

6. The apparatus as set forth in claim 4, wherein each record further comprises:

a management object type field storing a type of an object, wherein said tree structure data creating unit develops the tree structure data for each object from said database table to the memory unit corresponding to content of the management object type field.

7. The apparatus as set forth in claim 4, wherein each node of the tree structure has node update information that represents whether or not the inventory quantity corresponding to each node has been updated by said inventory retrieving unit, and further comprising a database updating unit affecting an update state of the tree structure data corresponding to the node update information.

8. A computer program product comprising a computer usable medium having computer readable program code embodied therein causing a computer to perform an inventory managing process comprising:

creating a tree of nodes formed in a plurality of levels, each level corresponding to a different attribute, and each node storing an attribute value and an inventory quantity corresponding to a number of items with the respective attribute value;

designating attributes and attribute values of an object as a retrieving condition; and executing an inventory retrieving process updating the inventory quantity of each node while searching each node corresponding to the retrieving condition, wherein each node with priority corresponding to a horizontal position of each node in levels corresponding to attributes that are not included in the retrieving condition is searched during searching each node on the binary tree data, wherein the inventory retrieving process is automatically performed according to a predetermined rule even in the case where the retrieving condition of the inventory retrieving process is not part of a query, by determining the attribute value of the management object.

9. An inventory management method comprising:

forming a tree of nodes formed in a plurality of levels, each level corresponding to a different attribute, and each node storing an attribute value and an inventory quantity of a management object;

receiving a query for an item, the query including a quantity, at least one attribute, and a value for each respective attribute; and searching the nodes for the item starting with a top node in the tree, wherein, when searching a node with a lower level corresponding to an attribute received in the query, searching a node in said lower level containing a received value for the respective attribute, and, when searching a node with a lower level corresponding to an attribute not received in the query, searching a node in said lower level from left to right, wherein the inventory retrieving process is automatically performed according to a predetermined rule even in the case where the retrieving condition of the inventory retrieving process is not part of the query, by determining the attribute value of the management object.

10. The method recited in claim 9, further comprising updating the inventory quantity stored in an updated node when a change in an actual inventory quantity occurs, using said searching the nodes process to locate the updated node.

11. The method recited in claim 9, wherein said searching the nodes is performed using distributed processes.

12. A computer program product comprising a computer usable medium having computer readable code embodied therein causing a computer to perform an inventory management method comprising:

forming a tree of nodes formed in a plurality of levels, each level corresponding to a different attribute, and each node storing an attribute value and an inventory quantity of a management object;

receiving a query for an item, the query including a quantity, at least one attribute, and a value for each respective attribute; and searching the nodes for the item starting with a top node in the tree, wherein, when searching a node with a lower level corresponding to an attribute received in the query, searching a node in said lower level containing a received value for the respective attribute, and, when searching a node with a lower level corresponding to an attribute not received in the query, searching nodes in said lower level from left to right, wherein the inventory retrieving process is automatically performed according to a predetermined rule even in the case where the retrieving condition of the inventory retrieving process is not part of the query, by determining the attribute value of the management object.

13. The computer program product recited in claim 12, further comprising updating the inventory quantity stored in an updated node when a change in an actual inventory quantity occurs, using said searching the nodes process to locate the updated node.

14. The computer program product recited in claim 12, wherein said searching the nodes is performed using distributed processes.

15. An inventory management apparatus comprising:

a tree forming device forming a tree of nodes in a plurality of levels, each level corresponding to a different attribute, and each node storing an attribute value and an inventory quantity of a management object;

a query receiving device, receiving a query for an item, the query including a quantity, one or more attributes, and a value for each respective attribute;

a tree searching device searching the nodes for the item starting with a top node;

said tree searching device, when visiting a node with a lower level corresponding to a received attribute in the query, searches a node in said lower level containing a received value for a respective attribute; and said tree searching device, when visiting a node with a lower level corresponding to an attribute not received in the query, searches nodes in said lower level from left to right, wherein the inventory retrieving process is automatically performed according to a predetermined rule even in the case where the retrieving condition of the inventory retrieving process is not part of the query, by determining the attribute value of the management object.

16. The inventory management apparatus recited in claim 15, further comprising and updating device updating the inventory quantity stored in an updated node when a change in an actual inventory quantity occurs, using said tree searching device to locate the updated node.

17. The inventory management apparatus recited in claim 15, wherein said tree searching device searches the tree using distributed processes.

* * * * *